FIG. 3A

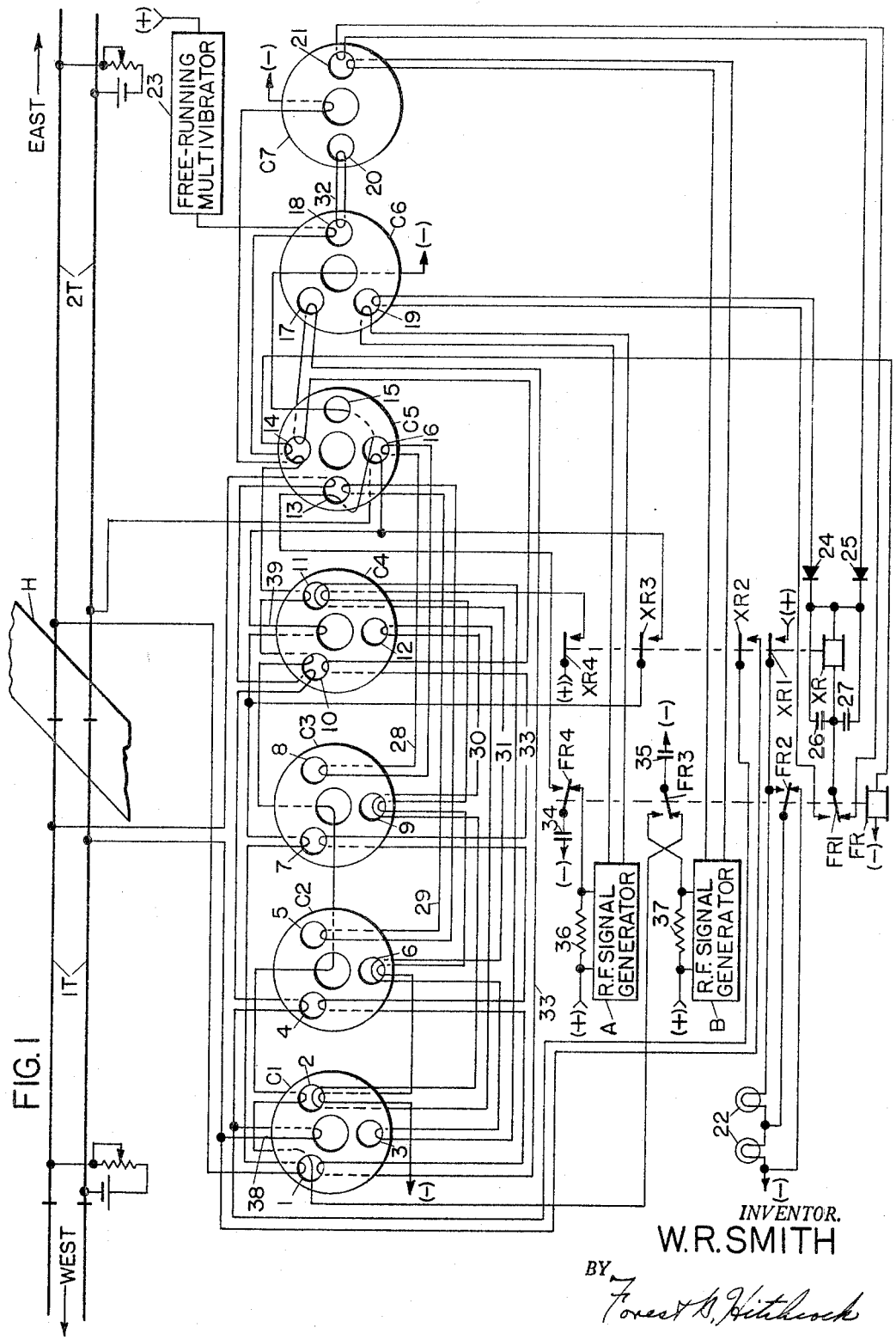

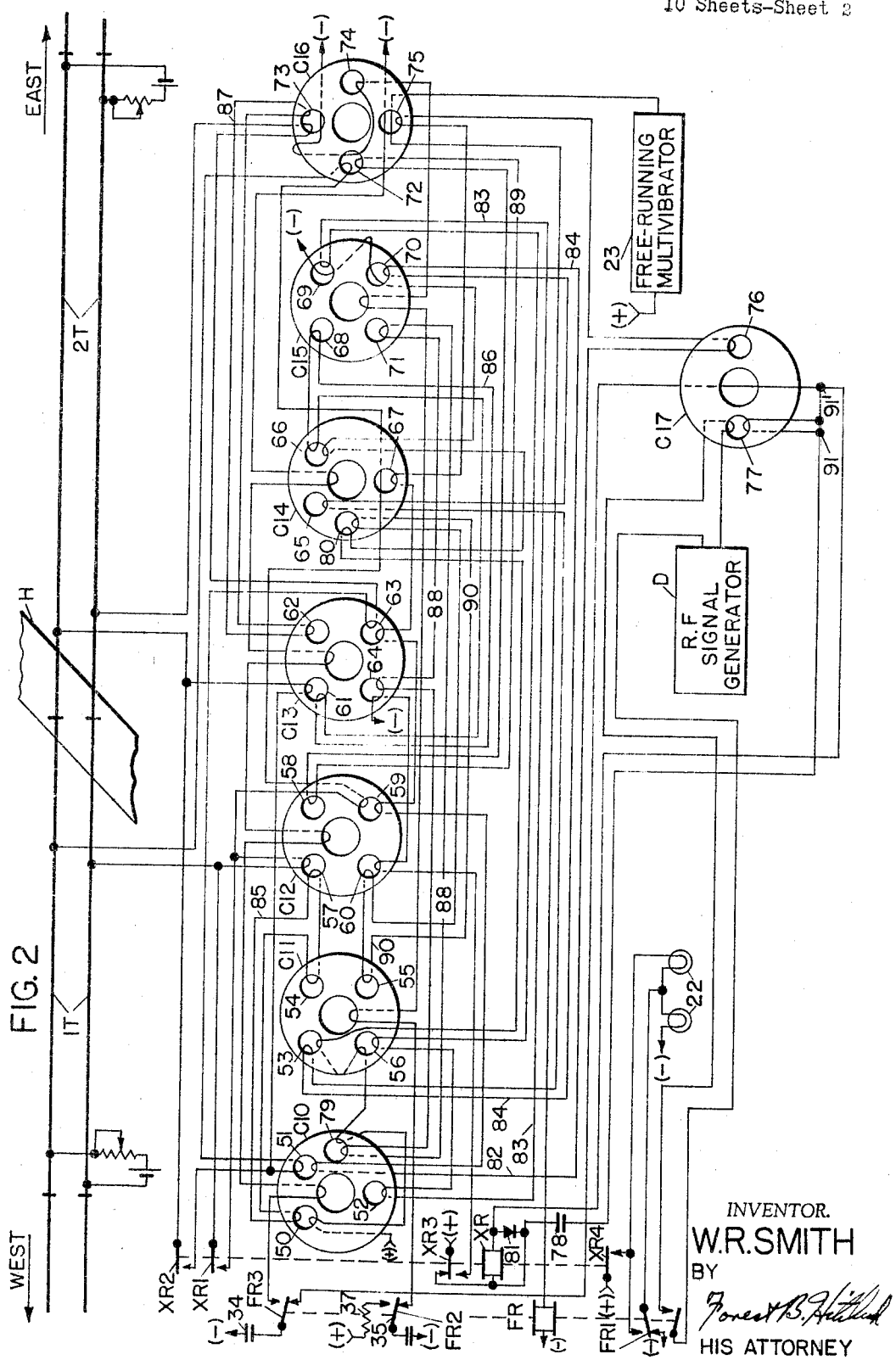

Eastbound Trains

| CORE APERATURE | C10 50 | C10 51 | C11 52 | C11 53 | C11 54 | C11 55 | C12 56 | C12 57 | C12 58 | C12 59 | C13 60 | C13 61 | C13 62 | C13 63 | C13 64 | C14 65 | C14 66 | C14 67 | C14 80 | C15 68 | C15 69 | C15 70 | C16 71 | C16 72 | C16 73 | C16 74 | C17 75 | C17 76 | RELAY XR | WARNING MEANS |
|---|---|---|---|---|---|---|---|---|---|---|---|---|---|---|---|---|---|---|---|---|---|---|---|---|---|---|---|---|---|---|
| RELAY FR / TRACK SECTION | | TO 76 | | | | | | | TO 76 | | | | TO 76 | | | | | | TO 76 | | | | | | | | | | | |
| IT & 2T VACANT UP | P | P | P | P | | P | P | P | | P | P | P | | | P | P | P | | P | | | P | | | P | P | | S | UP | OFF |
| DOWN | P | P | P | P | | P | P | PO | | P | P | PO | | | P | P | P | | P | | | P | | P | P | DO | | S | | |
| UP | P | P | P | P | | P | P | P | S | P | P | P | S | | P | P | P | | P | | | P | | DO | DO | DO | | S | | |
| DOWN | P | P | P | P | | P | P | PO | S | P | P | PO | S | | P | P | P | | P | | | P | | P | P | DO | | S | | |
| IT SHUNTED UP | P | P | P | P | | P | P | P | | P | P | P | | | P | P | P | | P | | | P | | DO | DO | DO | DOWN | S | DOWN | ON |
| DOWN | P | P | P | P | | P | P | P | | P | P | O | | | P | P | P | | P | | | P | | P | P | DO | | P | | |
| IT & 2T SHUNTED UP | P | P | P | P | | P | P | P | | P | P | P | | P | P | P | P | | P | | S | P | | P | DO | DO | | P | | |
| DOWN | P | P | P | P | | P | P | P | | P | P | P | | PO | P | P | P | | PO | | S | P | | P | DO | DO | | P | | |
| UP | P | P | P | P | | P | P | P | | P | P | P | S | P | P | P | P | | P | | S | P | | P | DO | DO | | P | | |
| DOWN | P | P | P | P | | P | P | P | | P | P | P | S | PO | P | P | P | | PO | | | P | | P | DO | DO | | P | | |
| 2T SHUNTED UP | P | P | P | P | | P | P | P | | P | P | P | | | P | P | P | | PO | S | | P | | P | DO | DO | | P | | |
| DOWN | P | P | P | P | | P | P | P | | P | P | P | | | P | P | P | | PO | S | | P | | P | DO | DO | | P | | |
| UP | P | P | P | P | | P | P | PO | S | P | P | PO | S | | P | P | PO | | PO | S | | P | | P | DO | DO | | P | | |
| DOWN | P | P | P | P | | P | P | PO | S | P | P | PO | S | | P | P | PO | | PO | S | | P | | P | DO | DO | | P | | |
| IT & 2T VACANT UP | P | P | P | P | | P | P | PO | | P | P | PO | | | P | P | PO | | PO | | | P | P | DO | DO | DO | | S | UP | OFF |
| DOWN | P | P | P | P | | P | P | P | | P | P | P | | | P | P | P | | P | | | P | P | DO | DO | DO | | S | | |

KEY
P = PRIME CURRENT
S = SET
O = OUTPUT CURRENT
D = DRIVE CURRENT

ONLY 60 WITHOUT 80 SETS 55
ONLY 64 WITHOUT 79 SETS 71
ANY TWO OF 51,59,63 & 67 SETS 76
72 SETS 58
73 SETS 62
ONLY 56 WITHOUT 69 SETS 52

ONLY 70 WITHOUT 53 SETS 65
ONLY 50 WITHOUT 57 SETS 54
ONLY 66 WITHOUT 61 SETS 65

INVENTOR
W.R. SMITH
BY Forest M. Hibbard
HIS ATTORNEY

FIG. 3B

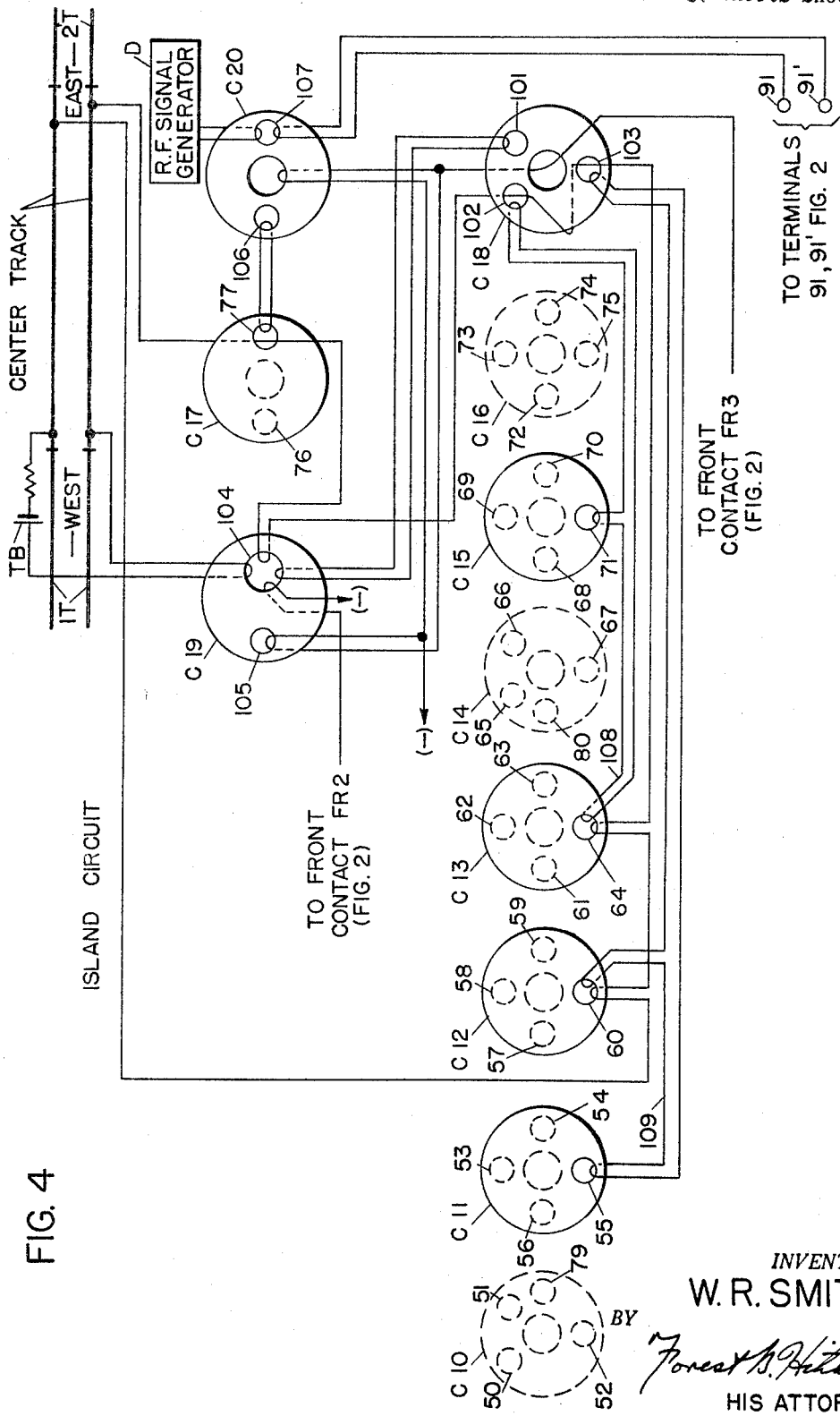

FIG. 5A

INVENTOR
W.R. SMITH
BY Forest B. Hitchcock
HIS ATTORNEY

Figure 5B:
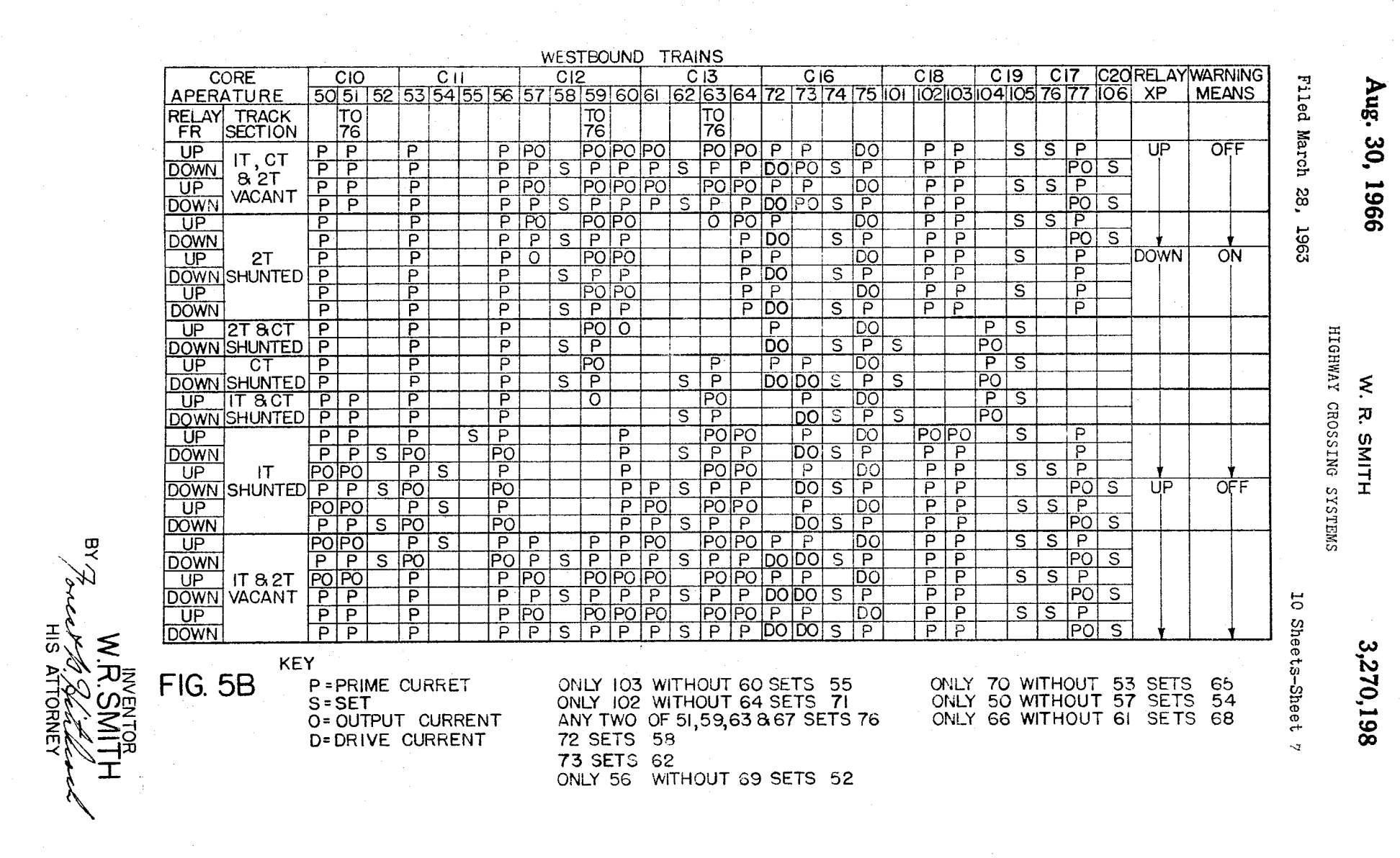

Aug. 30, 1966 W. R. SMITH 3,270,198
HIGHWAY CROSSING SYSTEMS
Filed March 28, 1963 10 Sheets-Sheet 7

FIG. 5B (Table omitted due to complexity)

KEY
P = PRIME CURRENT
S = SET
O = OUTPUT CURRENT
D = DRIVE CURRENT

INVENTOR
W.R. SMITH
BY
HIS ATTORNEY

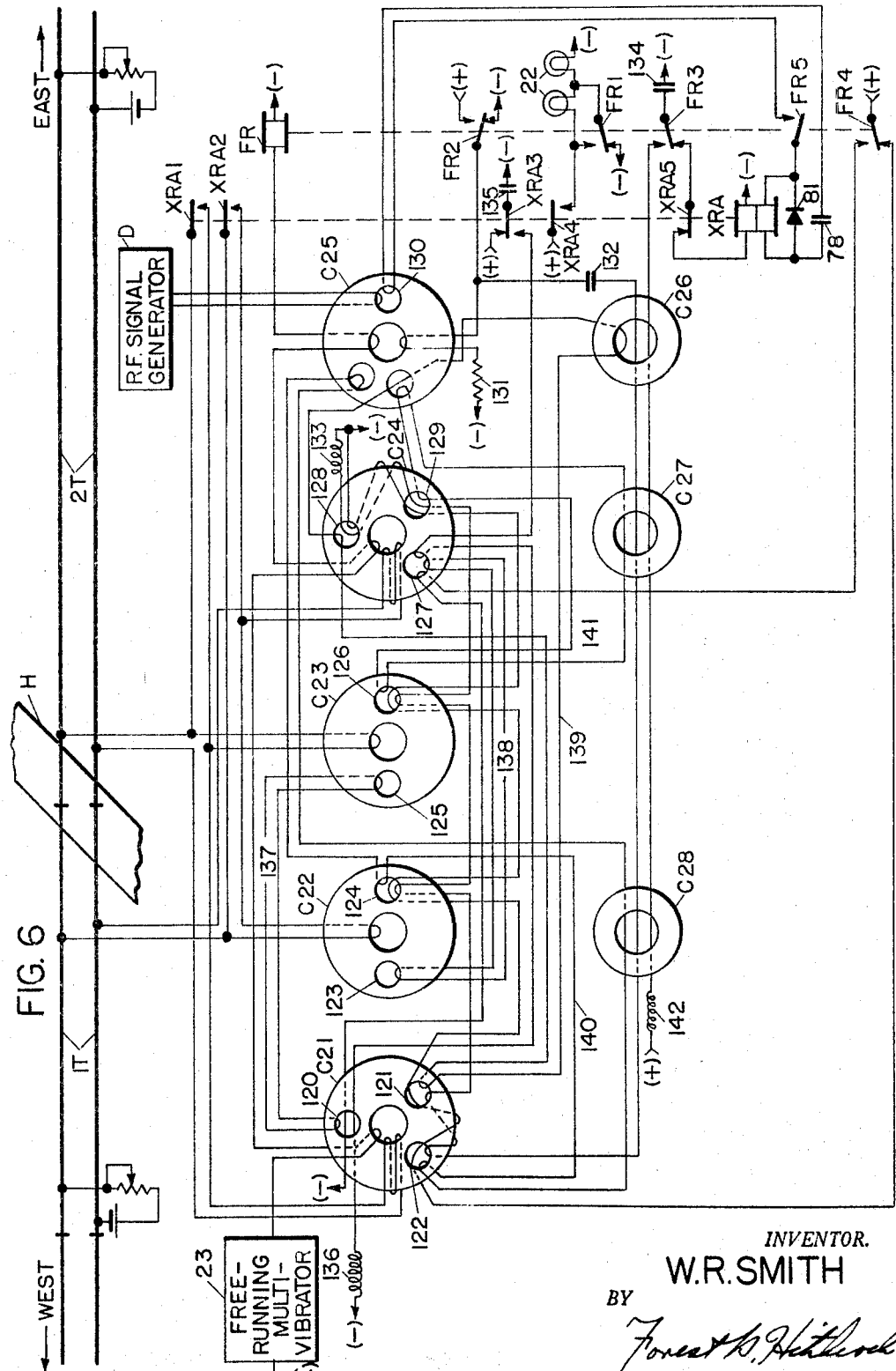

FIG. 7A

| CORE APERTURE | | C21 | | | C22 | | | C23 | | | C24 | | | C25 | | | C26 | C27 | C28 | XRA RELAY | WARNING MEANS |
|---|---|---|---|---|---|---|---|---|---|---|---|---|---|---|---|---|---|---|---|---|---|
| RELAY FR | TRACK SECTION | 120 | 121 | 122 MAJ | 123 MAJ | 124 | 125 MAJ | 126 MAJ | 127 | 128 | 129 MAJ | 130 | 143 | 144 MAJ | | | | | | | |
| UP | IT &2T | P | DO | S | | D | C | | D | P | DO | S | | S | | | SDO | SDO | SDO | UP | OFF |
| DOWN | | | P | | | P | | | P | | P | | PDO | | | | | | | | |
| UP | VACANT | P | DO | S | | D | C | | D | P | DO | S | | S | | | SDO | SDO | SDO | | |
| DOWN | | | P | | | P | | | P | | P | | PDO | | | | | | | | |
| UP | IT SHUNTED | PDO | DO | S | | D | | S | DO | PDO | DO | S | | | | | SDO | SDO | SDO | DOWN | ON |
| DOWN | | | P | | | P | | | P | | P | | | | C | | | | | | |
| UP | | P | D | S | | D | | | DO | D | D | C | | | | N | SDO | SDO | SDO | | |
| DOWN | | | P | | | P | | | P | | P | | PD | | C | | | | | | |
| UP | | P | D | S | | D | | | DO | D | D | C | | | | N | SDO | SDO | SDO | | |
| DOWN | | | P | | | P | | | P | | P | | PD | | C | | | | | | |
| UP | IT &2T SHUNTED | P | D | C | | D | C | | D | D | D | C | | | | N | SDO | SDO | SDO | | |
| DOWN | | | P | | | P | | | P | | P | | PD | | C | | | | | | |
| UP | | P | D | C | | D | C | | D | D | D | C | | | | N | SDO | SDO | SDO | | |
| DOWN | | | P | | | P | | | P | | P | | PD | | C | | | | | | |
| UP | 2T SHUNTED | P | D | C | | D | C | | D | D | D | C | | | | | SDO | SDO | SDO | | |
| DOWN | | | P | | | P | | | P | | P | | PD | | C | | | | | | |
| UP | | P | D | C | | D | C | | D | D | D | C | | | | | SDO | SDO | SDO | | |
| DOWN | | | P | | | P | | | P | | P | | PD | | C | | | | | | |
| UP | IT &2T | P | DO | S | | D | C | C | D | P | DO | S | S | S | | | SDO | SDO | SDO | UP | OFF |
| DOWN | | | P | | | P | | | P | | P | | PDO | | C | | | | | | |
| UP | VACANT | P | DO | S | | D | C | C | D | P | DO | S | S | S | | | SDO | SDO | SDO | | |
| DOWN | | | P | | | P | | | P | | P | | PDO | | C | | | | | | |

EASTBOUND TRAINS

KEY
P = PRIME
S = SET
O = OUTPUT CURRENT
N = NEUTRALIZING CURRENT
D = DRIVE CURRENT
C = CLEAR

121 AND 128 SETS C25
122 AND 124 SETS C25
126 AND 129 SETS C25
127 SETS 123
120 SETS 125

INVENTOR
W. R. SMITH
BY *Forest B. Hitchcock*
HIS ATTORNEY

Aug. 30, 1966  W. R. SMITH  3,270,198
HIGHWAY CROSSING SYSTEMS
Filed March 28, 1963  10 Sheets-Sheet 10

WESTBOUND TRAINS

| RELAY TRACK SECTION | CORE APERATURE | C21 120 | 121 | 122 MAJ | C22 123 | 124 MAJ | C23 125 | 126 MAJ | C24 127 | 128 | 129 MAJ | 130 | C25 143 | 144 MAJ | C26 | C27 | C28 | XRA RELAY | WARNING MEANS |
|---|---|---|---|---|---|---|---|---|---|---|---|---|---|---|---|---|---|---|---|
| IT & 2T VACANT | UP | P | DO | S | | D | C | | D | DO | S | PDO | S | | | SDO | SDO | SDO | UP | OFF |
| | DOWN | P | P | S | | P | C | | P | P | S | P | S | | | SDO | SDO | SDO | | |
| | UP | P | DO | S | | D | C | | D | DO | S | PDO | S | | | | SDO | SDO | | |
| | DOWN | P | P | S | | P | C | | P | P | S | P | S | | | | SDO | SDO | | |
| 2T SHUNTED | UP | P | D | C | S | DO | | | DO | DO | S | PD | | | | SDO | SDO | SDO | DOWN | ON |
| | DOWN | P | P | C | | P | | | P | P | S | P | | | | SDO | SDO | SDO | | |
| | UP | P | D | C | | D | | | D | DO | S | PD | | | N | SDO | SDO | SDO | | |
| | DOWN | P | P | C | | P | | | P | DP | S | P | | | C | SDO | SDO | SDO | | |
| IT & 2T SHUNTED | UP | P | D | C | | D | | | D | D | C | PD | | | N | SDO | SDO | SDO | | |
| | DOWN | P | P | C | | P | | | P | P | C | P | | | C | SDO | SDO | SDO | | |
| | UP | P | D | C | | D | | | D | D | C | PD | | | N | SDO | SDO | SDO | | |
| | DOWN | P | P | C | | P | | | P | P | C | P | | | C | SDO | SDO | SDO | | |
| IT SHUNTED | UP | P | DO | S | | D | C | | D | D | C | PDO | S | | C | SDO | SDO | SDO | UP | OFF |
| | DOWN | P | P | S | | P | C | | P | P | C | P | S | | C | SDO | SDO | SDO | | |
| | UP | P | DO | S | | D | C | | D | D | C | PDO | S | | C | SDO | SDO | SDO | | |
| | DOWN | P | P | S | | P | C | | P | P | C | P | S | | C | SDO | SDO | SDO | | |
| IT & 2T VACANT | UP | P | DO | S | | D | C | | D | DO | S | PDO | S | | C | SDO | SDO | SDO | | |
| | DOWN | P | P | S | | P | C | | P | P | S | P | S | | C | SDO | SDO | SDO | | |
| | UP | P | DO | S | | D | C | | D | DO | S | PDO | S | | C | SDO | SDO | SDO | | |
| | DOWN | P | P | S | | P | C | | P | P | S | P | S | | C | SDO | SDO | SDO | | |

KEY
- P = PRIME
- S = SET
- O = OUTPUT
- N = NEUTRALIZING CURRENT
- D = DRIVE CURRENT
- C = CLEAR

121 AND 128 SETS C25
122 AND 124 SETS C25
126 AND 129 SETS C25

FIG. 7B

INVENTOR
W. R. SMITH
BY Forest W. Hitchcock
HIS ATTORNEY

United States Patent Office 3,270,198
Patented August 30, 1966

3,270,198
HIGHWAY CROSSING SYSTEMS
Willis R. Smith, Rochester, N.Y., assignor to General Signal Corporation, Rochester, N.Y., a corporation of New York
Filed Mar. 28, 1963, Ser. No. 268,722
17 Claims. (Cl. 246—126)

This invention relates to highway crossing protection systems, and more particularly to direct current track circuit protection systems using apertured ferrite cores to provide the logic required to operate warning signals at the crossing.

Heretofore, highway crossing systems have made extensive use of logic relays and track relays. However, circuits using relays require periodic maintenance, inasmuch as the relays are electromechanical devices which eventually wear out with periodic servicing. Therefore, it is obviously desirable to replace such electromechanical devices wherever possible with magnetic solid state devices that last indefinitely due to absence of moving parts, such as apertured ferrite cores. These cores are small, light, rugged and relatively insensitive to adverse atmospheric conditions. A highway crossing protection system utilizing apertured ferrite cores is disclosed in the pending application of R. C. Buck, Ser. No. 222,434, filed Sept. 10, 1962, wherein the cores are used in conjunction with an overlay track circuit type highway crossing and an island type D.C. track circuit highway crossing. In the D.C. track circuits of the aforementioned Buck application, control of the warning lights is accomplished by circulation of a binary ONE through the core circuit sequentially, depending upon the location of an approaching or receding train. The present invention discloses highway crossing protection systems utilizing a network of apertured ferrite cores in conjunction wih D.C. track circuits. without need for circulating a binary ONE sequentially through the core network.

The invention generally contemplates a highway crossing protection system having means for generating two direct current signals indicative of the presence of a train on either side of a highway crossing. Each signal is coupled to a single aperture in at least one core. Safety core means are periodically set from the flasher relay of the crossing warning means, permitting the network to actuate the warning means only when the proper cores in the system are set. The core network produces an output through the safety core means during presence of both of the signals and upon resumption of the first signal reappearing after both of the signals have disappeared. Means are additionally provided for adaptation of an embodiment of the novel system to use with an island type D.C. track circuit highway crossing system.

One object of this invention is to provide a fail-safe system for actuating highway crossing warning means when a train approaches the crossing on a single track from either direction, through a network of substantially simultaneous acting multi-aperture ferrite cores.

Another object is to provide a fail-safe highway crossing protection system utilizing a multi-aperture safety core requiring actuation of the warning means upon internal circuit failure.

Another object is to provide a fail-safe highway crossing protection system utilizing single aperture magnetic cores requiring actuation of the warning means upon internal circuit failure.

Another object is to provide a highway crossing warning system for use with direct current track circuits in which switching of apertured ferrite cores due to changes in track current is achieved substantially simultaneously each time a change in track current occurs.

Another object is to provide a network of apertured ferrite cores of operating warning means at a highway crossing, adapted for use with D.C. track circuits generating either two or three signals indicative of presence of a train at the highway crossing.

These and other objects and advantages of the invention will become apparent from the following description when read in conjunction with the accompanying drawings in which:

FIG. 1 is a schematic diagram of a first embodiment of the invention employing two radio frequency signal generators.

FIG. 2 is a schematic diagram of a second embodiment of the invention employing but a single radio frequency signal generator.

FIGS. 3A and 3B are sequence charts showing circuit conditions in the embodiment of FIG. 2 for the case of eastbound and westbound trains respectively.

FIG. 4 is a partial schematic diagram illustrating how the embodiment of FIG. 2 can be adapted to use with an island type D.C. track circuit highway crossing by use of additional cores.

FIGS. 5A and 5B are sequence charts showing circuit conditions in the embodiment of FIG. 2 for the case of eastbound and westbound trains respectively.

FIG. 6 is a schematic diagram of a third and preferred embodiment of the invention using a single radio frequency generator.

FIGS. 7A and 7B are sequence charts showing circuit conditions in the embodiment of FIG. 6 for the case of eastbound and westbound trains respectively.

Referring now to FIG. 1 for a more detailed description of the first embodiment of the invention, a track circuit comprising track sections 1T and 2T is shown, having a highway H intersecting the track at the insulated joints separating sections 1T and 2T. Current from track section 1T is used for priming minor apertures 13, 10 and 4 of cores C5, C4 and C2 respectively, as well as for clearing core C1 through its major aperture. Current from track section 2T is used for priming minor aperture 16 of core C5, clearing core C4 through its major aperture, and priming minor apertures 7 of core C3 and 1 of core C1. Core C5 functions as a safety core, described infra.

Warning means, such as signal lights 22, are operated by contact FR2 of flasher relay FR. This relay is periodically energized and deenergized from a free-running multivibrator 23 which also serves to prime output minor apertures 14 and 18 of cores C5 and C6 respectively. Therefore, contact FR4 of relay FR, which is constantly in motion, periodically couples pulses through minor apertures 13, 16 and 15 of core C5, and the major aperture of core C6. These pulses provide a set signal for core C5 through minor aperture 15, as well as the drive signal for non-destructive readout of core C5 through minor apertures 13 and 16. In addition, the pulses periodically clear core C6. Simultaneously with the pulses produced by front contact FR4, back contact FR3 of flasher relay FR provides clear pulses through the major apertures of cores C2, C3 and C7, as well as drive pulses for non-destructive readout of minor apertures 1 and 2 of core C1, minor apertures 10 and 11 of core C4, and minor aperture 14 of safety core C5.

A pair of radio frequency energy sources, such as signal generators A and B, provide non-destructive readout drive pulses for minor apertures 19 and 21 of cores C6 and C7, respectively. The radio frequency output signal from each of these respective apertures is coupled to a relay XR through diodes 24 and 25, respectively, across capacitors 26 and 27, respectively. Because relay XR is a direct current actuated relay, rectification through diodes 24 and 25 is necessary for relay operation. Capacitors 26 and 27 serve to smooth input pulses for relay XR, enabling the relay to remain steadily energized as long as minor apertures 19 and 21 of cores C6 and C7 respectively, produce output signals.

Contact FR1 of relay FR energizes relay XR with radio frequency energy from minor apertures 19 and 21 alternately. Therefore, as long as minor apertures 19 and 21 produce an output signal, relay XR remains energized. Cessation of output from either or both of these apertures causes relay XR to deenergize.

When relay XR deenergizes, contact XR1 provides energization for warning means 22, while contact XR4 provides priming signals for minor apertures 11, 9, 6 and 2 of cores C4, C3, C2 and C1, respectively. Contact XR2 provides a shunt across clear winding 38 of core C1, preventing core C1 from being cleared, and contact XR3 shunts clear winding 39 of core C4, preventing core C4 from being cleared.

Minor aperture 8 of core C3 is set from minor aperture 16 of core C5 through a coupling loop 28, while minor aperture 5 of core C2 is set from minor aperture 13 of core C5 through a coupling loop 29. Minor aperture 12 of core C4 is set when an output signal is produced from minor aperture 9 of core C3 and no output signal is produced from minor aperture 2 of core C1, through a coupling loop 30, thereby forming a half-exclusive OR circuit. Minor aperture 3 of core C1 is set when an output signal is produced from minor aperture 6 of core C2 and no output signal is produced from minor aperture 11 of core C4, through a coupling loop 31, thereby forming another half-exclusive OR circuit.

Minor aperture 20 of core C7 is set from minor aperture 18 of core C6 through a coupling loop 32. Minor aperture 17 of core C6 is set by production of output signals from any two minor apertures in the group consisting of minor aperture 1 of core C1, minor aperture 4 of core C2, minor aperture 7 of core C3, and minor aperture 10 of core C4, through a coupling loop 33. The combined signal in the loop is then of sufficient amplitude to overcome opposing signals produced from minor aperture 14 of safety core C5 and set minor aperture 17 of core C6. The signals provided from minor aperture 14 of core C5 are non-destructively produced.

In operation, assume no trains are on track sections 1T and 2T. Cores C2, C3, C6 and C7 are therefore periodically cleared. Core C1 is kept steadily clear by current from track section 1T, and core C4 is kept steadily clear by current from track section 2T. In addition, minor aperture 13 of safety core C5 is primed by the current in track section 1T, minor aperture 16 of core C5 is primed by the current in track section 2T and minor aperture 14 of core C5 is primed by the output of multivibrator 23 and is periodically driven from contact FR3. Moreover, cores C2, C3 and C7 are periodically cleared by contact FR3, while core C6 is simultaneously periodically cleared by contact FR4. Contact FR4 also produces drive pulses for non-destructive readout through minor apertures 13 and 16 of safety core C5, and set pulses for minor aperture 15 of core C5, as previously mentioned. Capacitor 34 which is connected by contact FR4 and capacitor 35 which is connected to contact FR3 both provide sharp pulses for passage through the various apertures from these contacts. Thus, when relay FR is deenergized, capacitor 34 is charged through the parallel combination of resistor 36 and the input impedance of radio frequency signal generator A. When relay FR is energized, capacitor 35 is charged through the parallel combination of resistor 37 and the input impedance of radio frequency signal generator B. Thus, radio frequency energy is always supplied to the circuit, regardless of whether relay FR is energized or deenergized. This assures continuous operation of relay XR. When flasher relay FR again energizes, capacitor 34 rapidly discharges through relatively low impedance circuits, producing sharp current pulses of low rise time through front contact FR4.

The non-destructive readout drive pulses applied to minor apertures 13 and 16 energize coupling loops 29 and 28 respectively, thereby setting cores C2 and C3 through minor apertures 5 and 8 respectively. Then upon occurrence of each clear pulse applied through the major apertures of cores C2 and C3, an output pulse is created on coupling loop 33 through minor apertures 4 and 7 respectively, thereby setting core C6 through minor aperture 17. Since relay XR is energized, contact XR4 is maintained open. Cores C1 and C4 are not set under these circumstances, since minor apertures 11, 9, 6 and 2 of cores C4, C3, C2 and C1 respectively, are not primed.

Now assume that an eastbound train approaching the highway crossing enters track section 1T. The train thereby shunts the rails of the section, causing loss of current therefrom. This halts priming of minor apertures 13, 10 and 4 of cores C5, C4 and C2, respectively, and prevents core C2 from being cleared. Loss of the prime signal on minor aperture 4 of core C2 prevents further setting of core C6 through coupling loop 33 after core C6 has cleared, since of the four apertures threaded by loop 33, only minor aperture 7 of core C3 retains its prime. Although aperture 1 of core C1 retains its prime from track circuit 2T, core C1, which is set by an output from aperture 6 of core C2, cannot be set because as stated above core C2 is in the clear state. Because core C6 can no longer be set, it can no longer produce output from minor apertures 18 and 19. Thus, minor aperture 20 of core C7 can no longer be set through coupling loop 32, causing loss of output from minor aperture 21 of core C7. Furthermore, energy is no longer coupled from minor aperture 19 of core C6 and minor aperture 21 of core C7, through diodes 24 and 25 respectively, to relay XR. This causes the relay to deenergize. Deenergization of relay XR causes energization of the crossing warning means through contact XR1. Core C2 can now no longer be set from minor aperture 13 of core C5 through coupling loop 29, since minor aperture 13 is now no longer primed. However, core C3 remains set, since minor aperture 16 of core C5 remains primed, thereby setting minor aperture 8 of core C3 through coupling loop 28. In addition, contacts XR2 and XR3 close, preventing cores C1 and C4 respectively from further clearing by directly short-circuiting clear windings 38 and 39 respectively.

Under the foregoing circumstances, contact XR4 produces prime signal for minor apertures 11, 9, 6 and 2 of cores C4, C3, C2 and C1, respectively. Output is thus obtained from minor aperture 9 of core C3 because the core is periodically set and cleared and minor aperture 9 is primed, while no output is obtained from minor aperture 2 of core C1 because core C1 remains clear due to absence of any set signal applied to the core. Therefore coupling loop 30 sets core C4 through minor aperture 12.

When the train enters the highway crossing it shunts the rails in track sections 1T and 2T. In addition to absence of current from section 1T, there is now loss of current from section 2T. This removes prime signals from minor apertures 16, 7 and 1 of cores C5, C3 and C1, respectively. In addition, no clear current can be applied through the major aperture of core C4 although this is of little consequence at this time since clear winding 39 through core C4 is presently short-circuited by contact XR3. It will be remembered however, that core C4 is set through minor aperture 12 by a signal on coupling loop 30 produced because of absence of an output from aperture 2 of core C1 from an output of minor aperture 9 of core C3. Since core C4 can no longer be cleared, it retains its set condition. Furthermore, loss of the prime signal through minor aperture 16 of core C5 prevents setting of core C3 through minor aperture 8, since pulses can no longer be produced upon coupling loop 28. Relay XR remains deenergized, and the warning means therefore remain energized.

As the eastbound train continues to progress along the track, the rear of the train passes the highway crossing, removing the shunt from track section 1T. This restores prime current through minor apertures 13, 10 and 4 of cores C5, C4 and C2, respectively. When minor aperture 13 of core C5 is primed, it produces set pulses on coupling loop 29, thereby setting core C2 through minor aperture 5. In addition, core C4 is set, having remained in the set condition as previously explained. Thus, an output signal is applied to coupling loop 33 from minor aperture 4 of core C2 and minor aperture 10 of core C4. These two signals combine to form a signal of sufficient amplitude to overcome the opposing current produced from minor aperture 14 of safety core C5 and set core C6 through minor aperture 17. Core C6 then sets core C7 through minor aperture 20. Thus, minor apertures 19 and 21 of cores C6 and C7 respectively, resume output which is coupled to relay XR, energizing the relay and turning off the crossing warning means. In addition, the short-circuits across clear windings 38 and 39 of cores C1 and C4 respectively, are removed by the opening of contacts XR2 and XR3 respectively. Core C1 now receives clear current from track section 1T. Furthermore, the prime signal is removed from minor apertures 11, 9, 6 and 2 of cores C4, C3, C2 and C1 respectively, by the opening of contact XR4 upon energization of relay XR.

When the rear of the train leaves track section 2T, prime current resumes flowing through minor apertures 16, 7 and 1 of cores C5, C3 and C1 respectively. In addition, current resumes flowing through winding 39, thereby clearing core C4. Core C3 becomes set through minor aperture 8 by a pulse applied to coupling loop 28 from aperture 16 of core C5. Moreover, pulses are produced on coupling loop 33 from minor aperture 4 of core C2 and minor aperture 7 of core C3, still being of amplitude in excess of and in opposition to, pulses produced from minor aperture 14 of core C5, enabling core C6 to remain set through its minor aperture 17. The circuit is now ready for another train to approach the highway crossing from either direction.

Operation of the circuit for a westbound train is similar to that for an eastbound train. However, in such case, current from track section 2T is shunted by the approaching train prior to current from track section 1T, and likewise, current from track section 2T resumes prior to current from track section 1T when the train leaves. Furthermore, in the case of a westbound train, core C1 is set through minor aperture 3 by coupling loop 31 because of output from minor aperture 6 of core C2 and lack of output from minor aperture 11 of core C4, when the train enters track section 2T. Thus, when relay XR deenergizes upon entry of the train onto track section 2T, clear winding 38 of core C1 is short-circuited, leaving the core in the set condition. Core C1 then remains set until the train leaves track section 1T.

Fail-safety is achieved by sensing the remanent magnetic states of cores C6 and C7. If for any reason, front contact FR4 should fail to produce clear pulses for core C6, non-destructive readout pulses could not be provided through minor apertures 13 and 16 of safety core C5. Thus, no signal could be read from these minor apertures, thereby preventing setting of cores C2 and C3. No output can then be produced on coupling loop 33, since cores C1 and C4 can never be set simultaneously, due to the interlocking effect of coupling loops 30 and 31 in requiring one of the cores to be clear in order to set the other. When no output is produced on coupling loop 33, core C6 cannot be set. Failure to set core C6 then prevents minor apertures 18 and 19 of core C6 from producing an output, in turn preventing core C7 from becoming set. Thus, minor aperture 21 of core C7 also cannot produce an output. As previously shown, loss of output signals from minor apertures 19 and 21 of cores C6 and C7 respectively, causes deenergization of relay XR, thereby actuating the warning means. Furthermore, if front contact FR3 should fail to produce pulses, core C7 produces no output from minor aperture 21, and again the warning means are actuated. Moreover, safety core C5 prevents output from a single core of the group consisting of cores C1–C4 from setting core C6 through minor aperture 17 and inadvertently deenergizing the warning means thereby.

Fail-safety is achieved in the remainder of the circuit by the fact that unintentional opening or short-circuiting of any of the remaining current-carrying leads also causes failure of output from minor apertures 19 and 21, again ultimately resulting in actuation of the warning means.

Referring now to FIG. 2 for a detailed description of the second embodiment of the invention, a multi-aperture core network is shown wherein current from track section 1T is used for priming minor apertures 72 of core C16, minor aperture 67 of core C14, and minor apertures 59 and 57 of core C12 while current from track section 2T is used for priming minor aperture 73 of core C16, minor apertures 63 and 61 of core C13, and minor aperture 51 of core C10. Core C16 functions as a safety core in a manner similar to that of core C5 in FIG. 1.

Warning means, such as signal lights 22, are operated by contact FR1 of flasher relay FR. This relay is periodically energized and deenergized by a signal from free-running multivibrator 23, which is also coupled through minor aperture 75 of safety core C16, for priming the aperture. Thus contact FR3 of relay FR, being constantly in motion, periodically couples pulses through the major aperture of core C17 to a relay XR, and thence to front contact XR3 of relay XR when flasher relay FR is deenergized, and couples pulses through the major apertures of cores C10, C12, C13 and C14, and minor apertures 75 of core C16 when relay FR is energized. Therefore, upon deenergization of relay FR, a clear pulse is applied to core C17 while upon energization of relay FR, clear pulses are applied to cores C10, C12, C13 and C14, and a non-destructive readout or drive pulse is applied to minor aperture 75 of core C16. However, relay XR must be energized in order to clear core C17, since front contact XR3 is connected in series with back contact FR3. Furthermore, upon deenergization of relay FR, capacitor 34 is charged through relay XR; however, upon energization of relay FR, capacitor 34 is discharged through the major apertures of cores C10, C12, C13 and C14, and minor aperture 75 of core C16. Simultaneously with the pulses produced by back contact FR3 from capacitor 34, pulses are produced from back contact FR2 of relay FR. These pulses, created by charging of capacitor 35 through resistance 37 upon energization of relay FR, and discharging of capacitor 35 upon deenergization of relay FR, serve to clear cores C11 and C15, as well as to set minor aperture 74 of core C16 and drive minor apertures 72 and 73 of core C16.

A source of radio frequency energy, such as signal generator D, provides non-destructive readout drive pulses for minor aperture 77 of core C17 through a front contact FR4 of relay FR. The output signal from aperture 77 is connected through a series circuit comprising capacitor 78 and relay XR. Half-wave rectifier means, such as diode 81, are connected in parallel with the relay. If diode 81 is polarized in the proper direction by connecting the cathode to capacitor 78, when core C17 is set a radio frequency signal is produced from minor aperture 77 of core C17 during the intervals in which relay FR is energized. This radio frequency signal energizes relay XR in the following manner.

During half cycles of the signal from signal generator D wherein radio frequency current flows from the anode to the cathode of diode 81, capacitor 78 acquires a charge polarized so that the positively charged capacitor plate is connected to relay XR. During opposite half cycles, radio frequency current flows through relay XR rather than through diode 81 because in this instance the diode is reverse-polarized. During these portions of the radio frequency signal cycle, capacitor 78 tends to acquire a charge such that the plate connected directly to relay XR would become polarized negatively. However, because of the series impedance of relay XR and capacitor 78, the capacitor does not have sufficient time to fully discharge and acquire a reverse charge such that the plate connected to the relay would become negatively polarized. Therefore, the relay is held energized by induced current coupled through its own inductance and through diode 81 during half cycles. In this fashion, core output as well as energy stored in capacitor 78 retains relay XR energized throughout an entire radio frequency alternating current cycle, even though the relay coil is polarized for direct current operation.

When back contact FR3 closes, core C17 is cleared. While core C17 is clear, minor aperture 77 produces substantially no output. However, during this interval, relay XR is held energized by a circuit through back contact FR3 and front contact XR3. When front contact FR3 is closed, core C17 is cleared, and assuming no trains on back sections 1T and 2T, relay XR is again held energized by radio frequency output from minor aperture 77 of core C17, which is set through its minor aperture 76 from a coupling loop 82 after being cleared.

When relay XR deenergizes, contact XR4 provides energization for warning means 22, while contact XR3 provides priming signals for minor aperture 60 of core C12, and minor aperture 64 of core C13. Contact XR2 short-circuits prime current through minor aperture 61 of core C13 when relay XR is deenergized, while contact XR1 short-circuits prime current applied to minor aperture 57 of core C12 when relay XR is deenergized.

Minor aperture 55 of core C11 is set from minor aperture 60 of core C12 through coupling loop 90, provided no output is produced from minor aperture 80 of core C14, while minor aperture 71 of core C15 is set from minor aperture 64 of core C13 through coupling loop 88, provided no output is produced from minor aperture 79 of core C10. Minor aperture 58 of core C12 is set from minor aperture 72 of core C16 through coupling loop 89, and minor aperture 62 of core C13 is set from minor aperture 73 of core C16 through coupling loop 87.

Coupling loop 82 provides set pulses for core C17 through minor aperture 76 whenever minor aperture 75 of core C16 is primed and output signals are produced from any two of the group of minor apertures consisting of minor apertures 51, 59, 63 and 67 of cores C10, C12, C13 and C14, respectively. If output is produced from only one minor aperture of the foregoing group, core C17 cannot be set, since the output from minor aperture 75 of safety core C16 exactly cancels the output from the one minor aperture. On the other hand, output from three minor apertures in the group also sets core C17, since it is impossible to reverse the direction of magnetic flux around minor aperture 77 of core C17 with an excessively large set signal through minor aperture 76 of core C17.

A coupling loop 83 provides set pulses for core C10 through minor aperture 52 when an output is produced from minor aperture 56 of core C11 and no output is produced from minor aperture 69 of core C15. Likewise, a coupling loop 84 provides set pulses for core C14 through minor aperture 65 when pulses are produced from minor aperture 70 of core C15 and no output is produced from minor aperture 53 of core C11. A coupling loop 85 provides set pulses for core C11 through minor aperture 54 when pulses are produced by core C10 from minor aperture 50 and no output is produced by core C12 from minor aperture 57. A coupling loop 86 provides set pulses for core C15 through minor aperture 68 when output pulses are produced by core C14 from minor aperture 66 and no output is produced by core C13 from minor aperture 61. Thus, coupling 83, 84, 85 and 86 each form separate half-exclusive OR circuits.

In operation, first assume no trains are on track sections 1T and 2T. At this time, every core except core C16 is periodically cleared by flasher relay contacts FR2 or FR3. Minor apertures 72 and 73 of core C16, being primed by track currents and receiving drive pulses from back contact FR2, respectively set core C12 through minor aperture 58 and core C13 through minor aperture 62. Additionally, core C16 receives set pulses from back contact FR2 through minor aperture 74.

Because minor aperture 59 of core C12 is primed with current from track section 1T and minor aperture 63 of core C13 is primed with current from track section 2T, minor apertures 59 and 63 produce output pulses on coupling loop 82. These output pulses, in the presence of the prime signal through minor aperture 75 of core C16, provide set pulses for core C17 through minor aperture 76. Thus, bursts of radio frequency pulses are periodically produced from minor aperture 77 of core C17, maintaining relay XR energized, and preventing warning means 22 from becoming energized.

Now assume that an eastbound train approaching the highway crossing enters track section 1T. The train thereby shunts the rails in section 1T, causing loss of current therefrom. This halts priming of minor apertures 57 and 59 of core C12, minor aperture 67 of core C14, and minor aperture 72 of core C16. Loss of the prime signal on minor aperture 59 of core C12 prevents further setting of core C17 through coupling loop 82, since only minor aperture 63 of those apertures producing a signal on loop 82 retains its prime. The warning means are thereby energized. This sequence is described in greater detail below.

Because relay XR is energized when the train enters track section 1T, minor aperture 60 of core C12 receives no prime signal from back contact XR3 at this instant, thereby preventing core C11 from becoming set through minor aperture 55. In order to set core C10 through minor aperture 52 by means of coupling loop 83, an output signal must be produced from minor aperture 56 of core C11. However, since core C11 is not set, such output signal cannot be produced at minor aperture 56. Thus, core C10 is not set through coupling loop 83 and no output signal can be produced at minor aperture 51 of core C10. Therefore, only minor aperture 63 of core C14 produces a signal on coupling loop 82. Since this single signal is insufficient to overcome the opposing signal from minor aperture 75 of safety core C16 and thereby maintain core C17 in the set condition, core C17 is cleared and remains clear. In this condition, no radio frequency signal can be produced at output minor aperture 77 of core C17, and therefore relay XR deenergizes. This sequence begins when back contact FR3 closes, clearing core C17 immediately after track section 1T is shunted. When back contact FR3 next opens, relay XR receives no energization since core C17 is not set. At this point relay XR drops out and back contact XR4 closes, energizing warning means 22. In addition, back contacts XR1 and XR2 close, short-circulating the respective prime currents applied to minor apertures 57 of core C12 and 61 of core C13. Although this is of no immediate consequence to minor aperture 57 of core C12, since no current is applied from track section 1T through minor aperture 57 due to presence of the train, prime current from track section 2T coupled to minor aperture 61 of core C13 is short-circuited.

When the train enters the highway crossing, it shunts the rails in track section 2T, causing loss of current from section 2T. This removes prime signals from minor apertures 73, 63 and 51 of cores C16, C13 and C10 respectively. Minor aperture 61 of core C13 is not primed due to short-circuiting of the prime winding through that aperture by contact XR2. Loss of prime current through minor aperture 73 of core C16 prevents further application of set pulses to minor aperture 62 of core C13 through coupling loop 87. Loss of set pulses applied to core C13 prevents minor aperture 64 of core C13 from setting core C15 through loop 88 coupled to minor aperture 71 of core C15. Thus, when the train shunts both track sections 1T and 2T, of the four periodically cleared cores having outputs coupled to loop 82, only core C14 remains set. Core C15 and C16 also remain set. Relay XR remains deenergized, and the warning means therefore remain energized.

As the eastbound train continues to progress along the track, the rear of the train passes the highway crossing, removing the shunt from track section 1T. This causes resumption of prime current through minor apertures 72, 67 and 59 of cores C16, C14 and C12, respectively. Priming of minor aperture 72 of core C16 causes production of set pulses on coupling loop 89 which set core C12 through minor aperture 58. Because minor aperture 59 of core C12 is primed, output pulses from core C12 are produced on coupling loop 82. In addition, core C14 is set from core C15 through coupling loop 84 since core C15 is set, minor aperture 70 of core C15 is primed, and no output is produced at minor aperture 53 of core C11, which is clear. Thus, resumption of prime current through minor aperture 67 of core C14 provides a second source of pulses for application to coupling loop 82, thereby enabling core C17 to be set through minor aperture 76. Hence, radio frequency output is resumed from minor aperture 77 of core C17, and relay XR again energizes. When relay FR next deenergizes, clearing core C17, relay XR sticks through its front contact XR3.

Energization of relay XR opens back contact XR4, deenergizing the warning means. Simultaneously, short-circuits across prime windings through minor apertures 57 of core C12 and 61 of core C13 are removed. Prime current thus resumes flowing through minor aperture 57 of core C12.

When the rear of the train leaves track section 2T, prime current resumes flowing through minor aperture 73 of core C16, minor apertures 61 and 63 of core C13, and minor aperture 51 of core C10. Output pulses are thereby produced from minor aperture 73 of core C16, setting core C13 through loop 87 coupled to minor aperture 62. Minor aperture 63 of core C13 provides output pulses to coupling loop 82. Relay XR remains actuated, and the warning means remain deenergized. Output pulses are also produced from primed minor aperture 61 of core C13, thereby halting setting of core C15 through minor aperture 68 from coupling loop 86. Further output from minor aperture 70 of core C15 is therefore halted, preventing further setting of core C14 through minor aperture 65 and further output from minor aperture 67 of core C14. Initial circuit conditions existing when no trains are present on track sections 1T and 2T are thereby re-established.

Figure 3B:
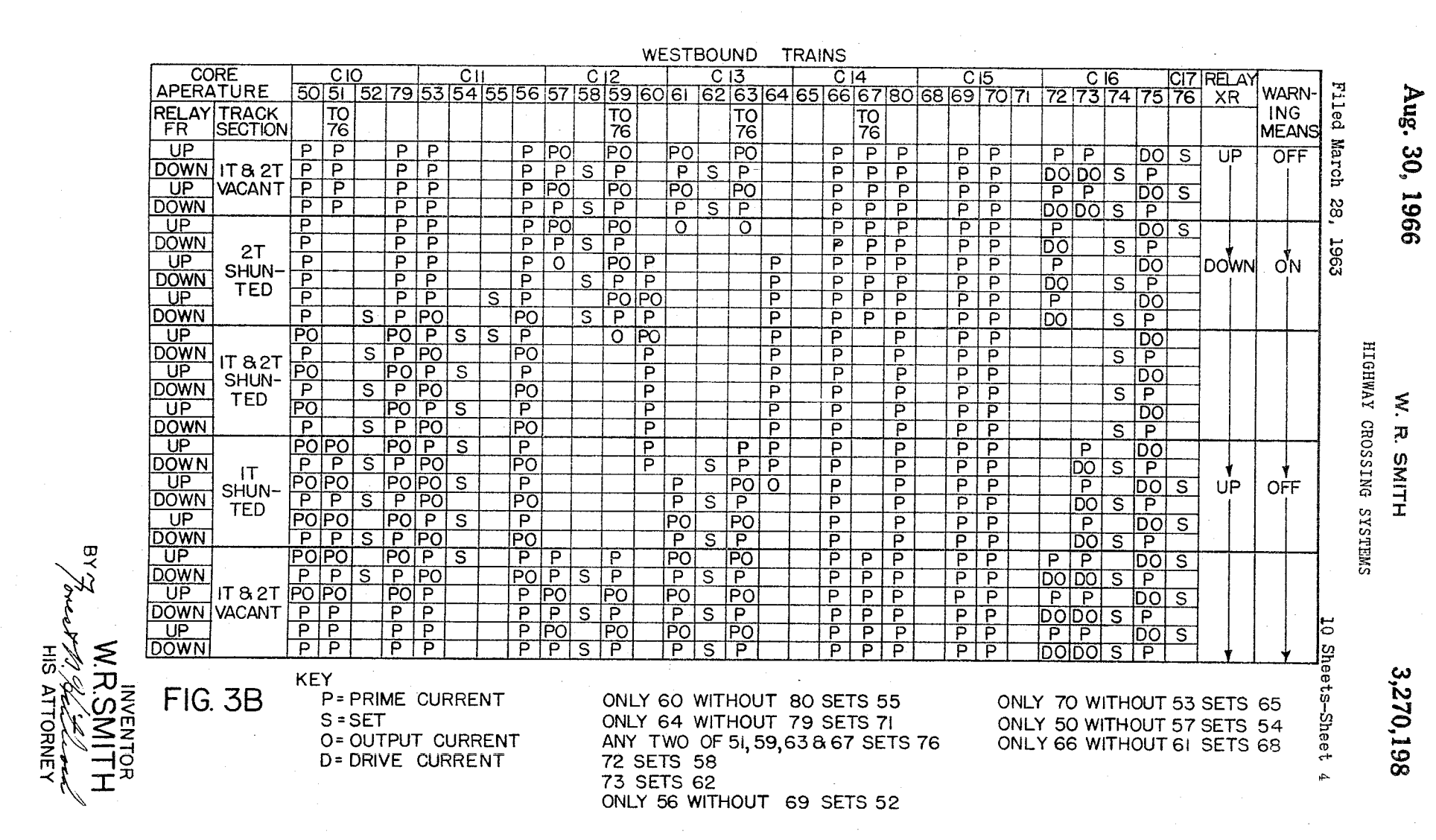

FIG. 3A graphically illustrates detailed current conditions, sequentially, through all minor apertures in the core circuit of FIG. 2 for passage over the highway crossing of an eastbound train, utilizing operation of relay FR as a time reference.

Operation of the circuit for a westbound train is similar to that for an eastbound train. However, in such case, current from track section 2T is shunted by the approaching train prior to current from track section 1T, and likewise current from track section 2T resumes prior to current from track section 1T when the train leaves.

When section 2T is first shunted in the case of a westbound train, output pulses on loop 82 are produced only from core C12. When section 1T and 2T are shunted simultaneously, none of the four cores have outputs coupled to loop 82 produce output pulses on the loops. After the rear of the train passes the crossing, output pulses are produced on loop 82 from cores C10 and C13. Finally, when the rear of the train leaves track section 1T, output pulses are produced on loop 82 first from cores C10, C12 and C13, and then from cores C12 and C13 only, re-establishing initial conditions existing when track sections 1T and 2T were vacant.

FIG. 3B graphically illustrates detailed current conditions sequentially, through all minor apertures in the core circuit of FIG. 2 for passage over the highway crossing of a westbound train, utilizing operation of relay FR as a time reference.

A large measure of fail-safety is achieved in the circuit of FIG. 2 by providing non-destructive readout drive pulses through minor apertures 72 and 73 of safety core C16, and by providing set pulses for core C16 through minor aperture 74 from back contact FR2, which also supplies clear pulses for cores C11 and C15. Thus, if for any reason clear pulses are not applied through cores C11 and C15, drive pulses cannot be provided through minor apertures 72 and 73 of safety core C16, preventing signal readout from these minor apertures. This condition also prevents setting of cores C12 and C13. No output can then be produced on coupling loop 82 when track sections 1T and 2T are vacant, since as can be seen from FIGS. 3A and 3B, only cores C12 and C13 produce outputs during these intervals under normal conditions.

Moreover, loop 83 requires that in order to set core C10, core C11 must be set, while loop 84 requires that in order to set core C14, core C11 must not be set. When an eastbound train shunts track section 2T, core C10 is not set, as can be seen from FIG. 3A, and loss of output from core C15 prevents core C14 from becoming set. On the other hand, when a westbound train shunts track section 1T, core C14 is not set, as can be seen from FIG. 3B, and loss of output from core C11 prevents core C10 from becoming set. Thus, failure to produce pulses on coupling loop 82 from any cores of the group consisting of cores C10, C12, C13 and C14, during the aforementioned times prevents core C17 from becoming set.

Hence aperture 77 of core C17 cannot be primed and non-destructively readout, causing deenergization of relay XR which thereby actuates the warning means. During all other times, as can be ascertained from FIGS. 3A and 3B, the warning means are actuated by the presence of a train, regardless of circuit failure.

If for any reason the circuit from back contact FR3 of the flasher relay should become open circuited, the energizing circuit for relay XR is broken, and the relay deenergizes, regardless of the remanent magnetic condition of core C17 at the instant the open circuit occurs. Under these circumstances the warning means are energized, thereby achieving fail-safety against such defect. Furthermore, if the circuit from front contact XR3 should break when core C17 is set, front contact FR4 causes relay XR to alternately energize and deenergize in unison with the energization and deenergization of relay FR, thereby causing alternate energization and deenergization of the warning means.

Fail-safety is achieved in the remainder of the circuit by the fact that unintentional opening or short-circuiting of the remaining current-carrying conductors also causes failure of output from minor aperture 77 of core C17, again ultimately resulting in actuation of the warning means.

Turning now to FIG. 4, there is shown a partial schematic diagram illustrating a circuit for adapting the embodiment of FIG. 2 to use with an island type D.C. track circuit highway crossing system by use of three additional cores C18, C19 and C20. The circuit of FIG. 2 is modified so that minor apertures 79 and 80 of cores C10 and C14 are not utilized. In place of coupling loop 88 of FIG. 2, a coupling loop 108 couples minor aperture 64 of core C13 and minor aperture 102 of core C18 to minor aperture 71 of core C15 in such manner that output from minor aperture 102 tends to set core C15 through minor aperture 71 while output from minor aperture 64 of core C13 tends to inhibit setting of core C15 through minor aperture 71. In place of coupling loop 90 of FIG. 2 a coupling loop 109 is used to link minor aperture 55 of core C11 with minor aperture 60 of core C12 and a minor aperture 103 of core C18 in such manner that output from minor aperture 103 tends to set core C11 through minor aperture 55 while output minor aperture 60 of core C12 tends to inhibit setting of core C11 through minor aperture 55.

Core C20 performs a function similar to that performed by core C17 in FIG. 2; that is, relay XR is operated by output from a minor aperture 107 of core C20 through terminals 91, 91' by a radio frequency signal provided from R.F. signal generator D coupled through minor aperture 107. Core C20 is periodically set by a signal applied through its minor aperture 106 from minor aperture 77 of core C17. A prime signal is supplied from the center track of an island-type highway crossing through minor aperture 77 of core C17, minor apertures 102 and 103 of core C18, minor aperture 64 of core C13 and minor aperture 60 of core C12. In addition, this current serves to inhibit a minor aperture 104 of core C19. Prime current for minor aperture 104 of core C19 is supplied from a track battery TB supplying the center track. Core C18 is set through a minor aperture 101 by a signal from minor aperture 104 of core C19. Drive pulses are supplied through minor aperture 104 of core C19 from back contact FR2 of relay FR, shown in FIG. 2. Set pulses for core C19 are supplied through a minor aperture 105 of the core from front contact FR3 of relay FR, shown in FIG. 2, while the same front contact also provides clear pulses through the major apertures of cores C18 and C20.

In operation, first assume no trains are on track sections 1T, 2T and CT. At this time, every core except core C16 is periodically cleared by one of flasher relay contacts FR2 or FR3. Minor apertures 72 and 73 of core C16, being primed by track currents and receiving drive pulses from back contacts FR2, respectively set core C12 through minor aperture 58 and core C13 through minor apertures 62. Additionally, core C16 receives set pulses from back contact FR2 through minor aperture 74. Minor aperture 104 of core C19 is not primed, since the inhibit signal from center track CT and the prime signal from center track battery TB oppose and exactly cancel each other through this minor aperture. This prevents setting of core C18 through minor aperture 101. Minor aperture 77 of core C17 remains primed by current from center track CT, and upon being cleared by the closing of back contact FR3, provides periodic set pulses to minor aperture 106 of core C20. This permits bursts of radio frequency energy to be applied from minor aperture 107 of core C20 to relay XR.

Now assume that an eastbound train approaching the highway crossing enters track section 1T. The train thereby shunts the rails in section 1T, causing loss of current therefrom. This halts priming of minor apertures 57 and 59 of core C12, minor aperture 67 of core C14, and minor aperture 72 of core C16. Loss of the prime signal on minor aperture 59 of core C12 prevents further setting of core C17 through coupling loop 82, since only minor aperture 63 of those apertures producing a signal on loop 82 retains its prime. The warning means are thereby energized, since minor aperture 77 of core C17 ceases to produce output pulses, in turn halting setting of core C20 through its minor aperture 106. The warning means are thereby energized. This sequence is detailed below.

Because relay XR is energized when the train enters track section 1T, minor aperture 60 of core C12 receives no prime signal from back contact XR3 at this instant. Thus, core C11 is not set through minor aperture 55. In order for core C10 to be set through minor aperture 52 by means of coupling loop 83, an output signal must be produced from minor aperture 56 of core C11. However, since core C11 is not set, no output signal is produced at minor aperture 56. Thus, core C10 is not set through coupling loop 83 and no output signal can be produced at minor aperture 51 of core C10. Therefore, only minor aperture 63 of core C14 produces a signal on coupling loop 82. Since this single signal is insufficient to overcome the opposing signal from minor aperture 75 of core C16 and thereby maintain core C17 in the set condition, core C17 is cleared and remains clear. In this condition, no radio frequency signal can be produced at output minor aperture 77 of core C17, and therefore core C20 cannot be set. Hence, the relay XR deenergizes. This sequence begins when back contact FR3 closes, clearing core C17 immediately after track section 1T is shunted. When back contact FR3 next opens, relay XR receives no energization since core C20 is not set. At this point relay XR drops out and back contact XR4 closes, energizing warning means 22. In addition, back contacts XR1 and XR2 close, short-circuiting the respective prime currents applied to minor aperture 57 of core C12 and minor aperture 61 of core C13. Although this has no immediate consequence on minor aperture 57 of core C12, since no current is supplied from track section 1T through minor aperture 57 due to presence of the train, prime current from track section 2T is short-circuited at minor aperture 61 of core C13.

As the train approaches the highway crossing, it shunts the rails in center track section CT, causing loss of current from section CT removing prime signals from minor apertures 77 of core C17, minor apertures 102 and 103 of core C18, minor aperture 60 of core C12 and minor aperture 64 of core C13. In addition, inhibit current is removed from minor aperture 104 of core C19, permitting this minor aperture to become primed by current from center track section battery TB. Minor aperture 104 of core C19 then produces an output upon occurrence of each drive pulse from back contact FR2 which is coupled through minor aperture 104.

At this point it is well to assume that the length of train moving eastbound is less than the overall length of center track CT, to determine that the circuit operates properly regardless of whether the train is many car lengths long, or is comprised merely of a small locomotive, such as a switch engine. The short train length provides the worst case for the crossing, since a long train maintains a shunt across track section 1T while also shunting track section 2T. However, a short train may shunt only center track section CT during a certain interval and then move on to shunt both track section 2T and center track section CT.

Assuming a train of length shorter than the length of center track section CT, during the interval when only center track section CT is shunted, prime current resumes flowing through minor apertures 72, 67 and 59 of cores C16, C14 and C12, respectively. Priming of minor aperture 72 of core C16 produces set pulses on coupling loop 89 which set core C12 through minor aperture 58. Because minor aperture 59 is primed, output pulses from core C12 are produced on coupling loop 82. However, core C14 is not yet set from core C15 through coupling loop 84 since core C15 is not yet set through its minor aperture 71 from minor aperture 102 of core C18, which is not primed. Thus, minor aperture 75 receives pulses from minor aperture 59 of core C12 only, and for reasons previously explained, core C17 cannot be set through minor aperture 76. The warning means therefore remain energized.

When the train leaves center track section CT, priming of minor aperture 104 of core C19 is halted, since flow of inhibiting current through this minor aperture resumes. Moreover, priming of minor apertures 102 and 103 of core C18, minor aperture 60 of core C12 and minor aperture 64 of core C13 resumes. Beginning with the immediately subsequent clear pulse through the major aperture of core C18, output pulses are produced from minor apertures 102 and 103. Moreover, core C12 being set through minor aperture 58, produces output pulses from minor aperture 60 immediately upon resumption of prime current through minor aperture 60. However, core C13 is no longer set through minor aperture 62, since major aperture 73 of core C16 loses its prime upon shunting of track section 2T. Therefore, no output is produced from minor aperture 64 of core C13. Hence, immediately upon removal of the shunt from center track section CT, minor aperture 102 of core C18 sets core C15 through minor aperture 71, while output from minor aperture 103 of core C18 is opposed by output from minor aperture 60 of core C12, preventing core C11 from becoming set through minor aperture 55. When core C15 is set, minor aperture 70 of core C15, being primed, produces an output which sets core C14 through minor aperture 65. Output is thus resumed from primed minor aperture 67 of core C14 which in conjunction with output from minor aperture 59 of core C12 provides energization through coupling loop 82 in excess of the opposing output from minor aperture 75 of core C16 to minor aperture 76 of core C17, enabling relay XR to again energize and thereby deenergize the warning means. Output also resumes from minor aperture 66 of core C14 which sets core C15 through minor aperture 68. Thus, core C15 continues to produce an output from its minor aperture 70 which in turn sets core C14 through minor aperture 65, permitting minor aperture 67 of core C14 to maintain an output and retain the warning means in the deenergized condition.

When the rear of the train leaves track section 2T, prime current resumes flowing through minor aperture 73 of core C16, minor apertures 61 and 63 of core C13, and minor aperture 51 of core C10. Output pulses are thereby produced from minor apertures 73 of core C16, setting core C13 through loop 87 coupled to minor aperture 62. Minor aperture 63 of core C13 then produces output pulses on coupling loop 82. Relay XR remains actuated, and the warning means remain deenergized. Output pulses are also produced from primed minor aperture 61 of core C13, thereby halting setting of core C15 through minor aperture 68 from coupling loop 86. Further, output from minor aperture 70 of core C15 is therefore halted, preventing further setting of core C14 through minor aperture 65 and further output from minor aperture 67 of core C14. Initial circuit conditions existing when no trains are present on track sections 1T, CT and 2T are thereby re-established.

Figure 5A:
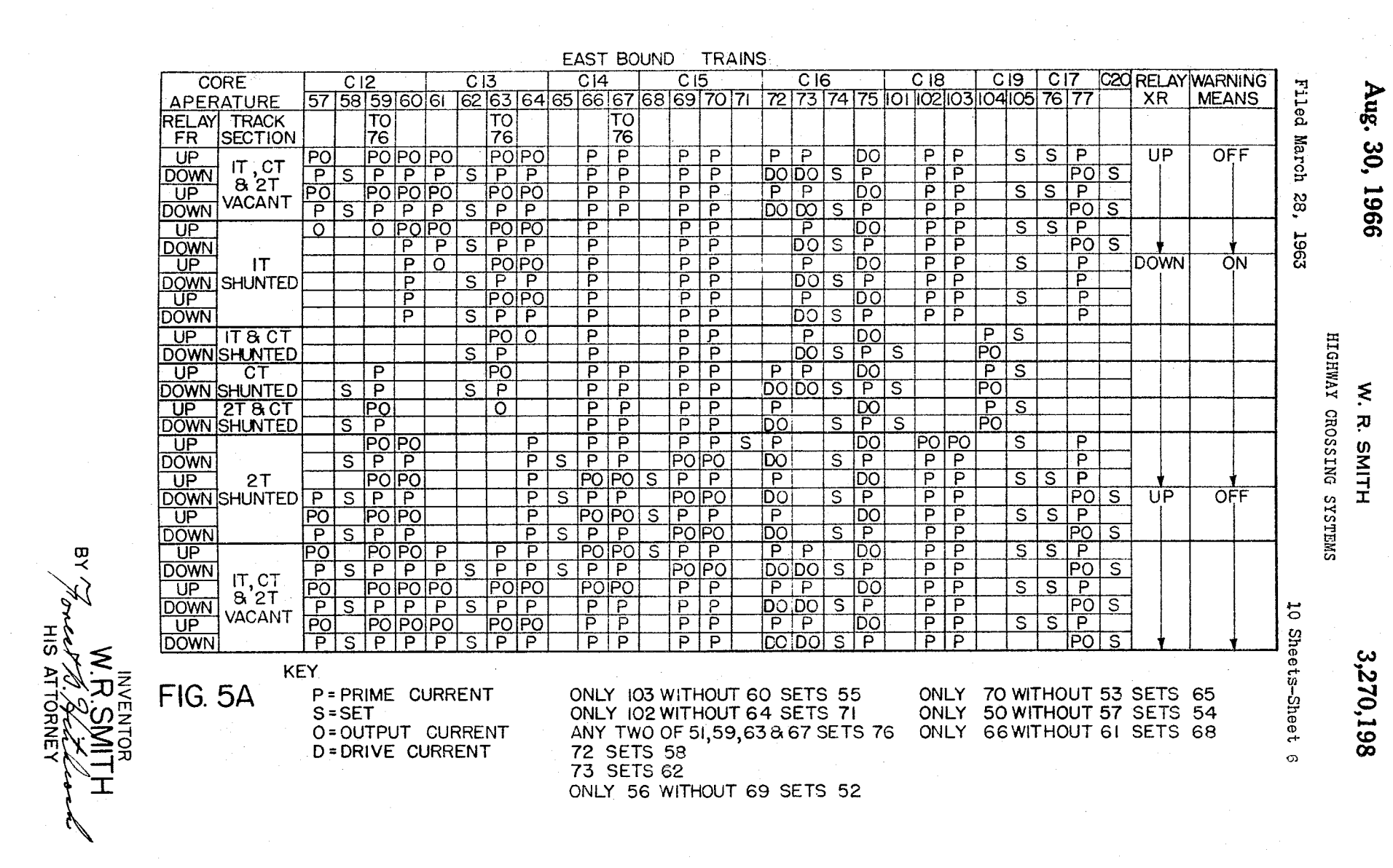

FIG. 5A graphically illustrates detailed current conditions, sequentially, through all minor apertures in the core circuit of FIG. 4 except those of cores C10 and C11, for passage of eastbound trains over the island-type highway crossing, utilizing operation of relay FR as a time reference. Sequences for cores C10 and C11 are omitted, since as can be seen from the sequences of FIG. 3A, cores C10 and C11 receive no set signals, and therefore produce no output.

Operation of the circuit for a westbound train is similar to that for an eastbound train. However, in such case, current from track section 2T is shunted by the approaching train prior to current from track section CT, and likewise current from track section 2T resumes flowing prior to current from track section CT when the train leaves section 2T. Moreover, current from track section CT is shunted by the approaching train prior to current from track section 1T, and likewise current from track section CT resumes flowing prior to current from track section 1T when the train leaves.

When section 2T is first shunted, output pulses on loop 82 are produced only from core C12. When sections 2T and CT are shunted simultaneously, output pulses on loop 82 continues to be produced only from core C12. When only center track section CT is shunted, output pulses are produced on loop 82 from minor apertures 59 and 63 of cores C12 and C13, respectively. However, while center track section CT is shunted, minor aperture 77 of core C17 is not primed. Therefore, core C20 is not set through its minor aperture 106, and relay XR remains deenergized. When track sections 1T and CT are shunted simultaneously, output pulses are produced on loop 82 from minor aperture 63 of core C13, and a single output pulse from minor aperture 59 of core C12 may also be produced on loop 82. However, since minor aperture 77 of core C17 is not primed as long as center track section CT is shunted, it can produce no output under this condition.

After the rear of the train leaves center track section CT, prime current from section CT resumes flowing through minor apertures 102 and 103 of core C18, minor aperture 60 of core C12, minor aperture 64 of core C13 and minor aperture 77 of core C17. Furthermore, minor aperture 104 of core C19 receives inhibiting current from center track section CT, preventing further output from the minor aperture. Moreover, output pulses are produced on loop 82 from cores C10 and C13. These pulses set core C17 through minor aperture 76, and since minor aperture 77 of core C17 is now primed, core C20 sets through its minor aperture 106, permitting energization of relay XR and deenergization of the warning means. Finally, when the rear of the train leaves track section 1T, output pulses are produced on loop 82 first from core C10, C12 and C13, and then from cores C12 and C13 only, re-establishing initial conditions existing when track sections 1T and 2T are vacant.

FIG. 5B graphically illustrates, in detail, current conditions sequentially, through all minor apertures in the core circuit of FIG. 4, except those of cores C14 and C15, for passage of westbound trains over the island-type highway crossing, utilizing operation of relay FR as a time reference. Sequences for cores C14 and C15 are omitted, since as can be seen from the sequence of FIG. 3A, cores C14 and C15 receive no set signals, and therefore produce no output.

Because this circuit is a modification of the circuit of FIG. 2, the fail-safe features of the circuit of FIG. 2 are also incorporated into the circuit of FIG. 4. Again therefore, if clear pulses are not applied through cores C11 and C15, drive pulses cannot be provided through minor apertures 72 and 73 of safety core C16, preventing signal readout from these minor apertures. This condition also prevents setting of cores C12 and C13. No output can then be produced on coupling loop 82 when track sections 1T, 2T and CT are vacant, since as can be seen from FIGS. 5A and 5B, only cores C12 and C13 produce outputs during these intervals under normal conditions. Therefore, core C17 cannot be set, and hence minor aperture 77 of core C17 cannot be primed and non-destructively read out, causing deenergization of relay XR which thereby actuates the warning means. Moreover, a discontinuity in the circuit of center track section CT prevents priming of minor aperture 77 of core C17, thereby again halting output from minor aperture 107 of core C20, causing relay XR to deenergize and actuate the warning means.

As previously stated, if for any reason the circuit from back contact FR3 of the flasher relay should become open circuited, the energizing circuit for relay XR is broken, and the relay deenergizes, regardless of the remanent magnetic condition of core C17 at the instant the open circuit occurs. Again, under these circumstances, the warning means are energized, thereby achieving fail-safety against such defect.

Fail-safety is achieved in the remainder of the circuit by the fact that unintentional opening or short-circuiting of the remaining current-carrying conductors also causes failure of output from minor aperture 107 of core C20, again ultimately resulting in actuation of the warning means.

Turning next to FIG. 6, there is shown a highway crossing system utilizing both single and multiple aperture cores. The fail-safe principal of this circuit is dependent upon the continuity of energy which clears some of the multiple aperture cores and controls operation of flasher relay FR. In this application, five multiple aperture cores, C21–C25, and three single aperture cores C26–C28, are used. Moreover, relay XRA, which serves to energize the warning means, has a split winding.

The track circuit comprises track sections 1T and 2T, with highway H intersecting the track at the insulated joints separating sections 1T and 2T. Current from track section 1T is applied through the major aperture of core C22 for clearing the core, and through the major aperture of core C24 for setting the core. Current from track section 2T is applied through the major aperture of core C23 for clearing the core, and through the major aperture of core C21 for setting the core. Current controlling flasher relay FR is applied to the relay from free-running multivibrator 23 through the major apertures of cores C21, C24 and C25. Thus, energy supplied from the multivibrator to relay FR also comprises clear current for cores C21, C24 and C25.

Flasher relay FR in turn operates warning means 22 through its contact FR1, which is constantly in motion, in the manner as explained in conjunction with FIG. 2. Front contact FR2 provides a neutralizing current coupled through the major aperture of core C25 through a series-connected current limiting resistor 131. This current opposes the effect of clear current through the major aperture of core C25, thereby neutralizing the effect of the clear current. Front contact FR2 also provides drive current through single aperture C26, C27 and C28, and through minor apertures 122 and 121 of core C21, minor aperture 124 of core C22, minor aperture 126 of core C23, and minor apertures 129 and 128 of core C24, in series with a capacitor 132 and an inductor 133. Use of a series LC circuit for passage of drive pulses therethrough provides longer duration current pulses with steep wavefronts. When back contact FR2 is closed, capacitor 132 discharges through the contact. Because of the presence of limiting resistor 131, when back contact FR2 closes, substantially all the charge on capacitor 132 passes through back contact FR2, and substantially no current passes through the major aperture of core C25 in a direction to oppose clear current through the core.

Front contact FR3 of relay FR provides set current through single aperture cores C26, C27 and C28 which simultaneously charges a capacitor 134 connected in series with an inductor 142. The inductor serves to lengthen the duration of set pulses while the capacitor provides steep set pulse wavefronts. When back contact FR3 closes, and relay XRA is energized, capacitor 134 discharges through closed front contact XRA5 of relay XRA and through the upper half of the split winding of relay XRA. This tends to retain relay XRA in the energized condition. When relay FR again energizes, front contact FR3 again closes, and capacitor 134 again charges.

Front contact FR5 of relay FR control energization of the lower half winding of relay XRA. When relay FR is energized, core C25 is set, due to current through front contact FR2 neutralizing clear current through the major aperture of core C25. Output is thereby produced from minor aperture 130 of core C25, through front contact FR5 to the lower half winding of relay XRA, maintaining the relay energized.

When flasher relay FR is energized, front contact FR4 provides prime current through minor aperture 127 of core C24 and minor aperture 120 of core C21. When flasher relay FR deenergizes, back contact FR4 closes, applying prime current through minor apertures 122 and 121 of core C21, minor aperture 124 of core C22, minor aperture 126 of core C23, and minor apertures 129 and 128 of core C24.

The lower half of the winding of relay XRA is connected in parallel with diode 81 and in series with capacitor 78. Energization for this half of the winding comes from minor aperture 130 of core C25 through front contact FR5 of relay FR, in the form of radio frequency energy induced by the signal from R.F. generator D which is coupled through minor aperture 130. As previously mentioned, front contact XRA5 is connected in series with the upper half winding of relay XRA and back contact FR3 of flasher relay FR, so as to enable relay XRA to remain energized by the discharge of capacitor 134 when back contact FR3 is closed. Front contact XRA3 permits a capacitor 135 to charge to an amplitude equivalent to that of the D.C. source voltage. When relay XRA deenergizes, back contact XRA3 closes and capacitor 135 discharges through minor apertures 127 and 120 of cores C24 and C21 respectively, providing a drive pulse through the aforementioned apertures. An inductance 136 is connected in series in this circuit so as to provide sharp drive pulses of lengthened duration. Moreover, when relay XRA is deenergized, back contacts XRA1 and XRA2 close, short-circuiting clear current from track section 2T through the major aperture of core C23 and from track section 1T through the major aperture of core C22, respectively.

Output pulses from minor aperture 120 of core C21 are coupled to minor aperture 125 of core C23 through a coupling loop 37, in a direction so as to set core C23. Likewise, output from minor aperture 127 of core C24 is applied to minor aperture 123 of core C22 through a coupling loop 138, in a direction so as to set core C22. A coupling loop 139 couples outputs from minor aperture 121 of core C21, minor aperture 128 of core C24, and core C26 to minor aperture 143 of core C25, in a direction such that outputs are required from both minor apertures 121 and 128 in order to overcome output from core C26 and set core C25 through minor aperture 143. A coupling loop 140 couples outputs from minor aperture 122 of core C21, minor aperture 124 of core C22, and core C28, to minor aperture 144 of core C25, in a direction such that outputs from both minor apertures 122 and 124 are required in order to overcome the output from core C28 and set core C25 through minor aperture 144. A coupling loop 141 couples outputs from minor aperture 126 of core C23, minor aperture 129 of core C24, and core C27, to minor aperture 143 of core C25 in a direction such that outputs from both minor apertures 126 and 129 are required in order to overcome the output from core C27 and set core C25 through minor aperture 143. From the foregoing, it is obvious that cores C26, C27 and C28 collectively provide a circuit function similar to that provided by the safety core in the preceding embodiments.

In operation, assume first that both track sections 1T and 2T are vacant. Under these circumstances, core C21 and C24 are both set through their major apertures, since the M.M.F.'s produced by track currents through these major apertures is greater than the M.M.F.'s produced by the clear windings carrying current from multivibrator 23. This is because the ratio of set ampere-turns through the major apertures of core C21 and C24 is adjusted to 2:1. Since cores C21 and C24 are set, outputs are produced from minor aperture 121 of core C21 and minor aperture 128 of core C24 on coupling loop 139, which sets core C25 through its minor aperture 143. The radio frequency signal from R.F. signal generator D through minor aperture 130 of core C25 provides both prime and drive pulses for this aperture, inducing bursts of radio frequency energy from minor aperture 130 during each interval in which core C25 is set, for the entire duration of the interval. These bursts are of sufficient energy to maintain relay XRA energized through capacitor 78 and diode 81 in a manner similar to that described in conjunction with FIG. 2 by maintaining the lower half winding of relay XRA energizing during the interval of each burst. Since the drive pulses producing energy on coupling loops 139, 140 and 141 occur when front contact FR2 is closed, closing of back contact FR2 does not produce set pulses through the major aperture of core C25; in fact, closing of back contact FR2 removes neutralizing current from the major aperture of core C25, causing the core to clear. During each interval in which core C25 is clear, its minor aperture 130 cannot be primed and driven and hence can produce no output.

Assume now that an eastbound train approaching the highway crossing enters upon track section 1T. This causes loss of current from section 1T to the core network, resulting in clearing of core C24 and loss of clear current through the major aperture of core C23. It should be noted that clearing of core C24 takes place gradually; that is, due to winding inductance of flasher relay FR, current change through the major aperture of core C24 occurs slowly. This prevents readout from primed apertures 128 and 129 when the set signal coupled through the major aperture of core C24 from track section 1T ceases. Thus, minor aperture 128 of core C24 ceases to produce an output, so that current produced on coupling loop 139 is supplied only from minor aperture 121 of core C21. This current is insufficient to overcome the output from toroid C26 on coupling loop 139 and thereby set core C25. Moreover, no output is produced from minor aperture 124 of core C22, since core C22 remains cleared, so that the signal produced on coupling loop 140 is supplied only from minor aperture 122 of core C21. This current is insufficient to overcome the output from toroid C28 and set core C25. Finally, no output is produced from minor aperture 129 of core C24, since core C24 is not set. Thus, core C25 cannot be set through coupling loop 141. Since it is therefore impossible to now set core C25, when relay FR2 is next deenergized, core C25 is cleared by current through its major aperture which energizes the coil of relay FR. On the other hand, when relay FR is next energized, contact FR2 couples neutralizing current through the major aperture of core C25 which opposes the clear current through the major aperture. Since the ampere turns ratio of the neutralizing winding to the clear winding through the major aperture of core C25 is unity, the magnetic fields coupling the core produced from currents through the major aperture tend to cancel each other. Thus, since core C25 now alternately clears and does not set, no output can be produced from minor aperture 130. This causes deenergization of relay ZRA, causing in turn, back contacts XRA1, XRA2, XRA3 and XRA4 to close. When back contact XRA3 closes, capacitor 135 discharges through minor aperture 120 of core C21, causing an output to be produced from the minor aperture. This output sets core C23 through minor aperture 125. When contact XRA1 is closed, core C23 cannot be cleared. Thus, core C23 remains in the set condition until relay XRA again energizes, opening its back contact XRA1 and permitting core C23 to again be cleared by current from track section 2T. Therefore, drive pulses coupled through minor aperture 126 of core C23 produce non-destructive readout pulses from the core until the core is again cleared. Minor apertures 121 and 122 of core C21 also produce non-destructive output pulses due to driven pulses coupled through these minor apertures while core C21 is set by current from track section 2T. Core C21 is set since the ratio of set ampere turns to clear ampere turns through the major aperture of core C21 is 2:1. Minor aperture 124 of core C22 cannot produce an output however, since core C22 is clear and no output is produced from minor aperture 127 of core C24 on coupling loop 138 to set core C22. Moreover, no output is produced from minor apertures 128 and 129 of core C24 for the same reason; namely, that no set current is coupled through the major aperture of core C24 from track section 1T since the track section is shunted by the presence of the eastbound train. Furthermore, since contact XRA4 is closed, warning means 22 are energized.

As the train passes the crossing, track sections 1T and 2T are both shunted. This removes set current from the major aperture of core C21, permitting the core to clear and thereby half production of output pulses from its minor apertures 121 and 122. Thus, no output is produced from minor aperture 130 of core C25, and relay XRA remains deenergized.

When the rear of the train passes the highway crossing, track section 1T again permits coupling of track current to the core network. This causes core C24 to set, and thus outputs are produced once again from its minor apertures 128 and 129. Since minor aperture 126 of core C23 is already producing an output, sufficient energy is applied to coupling loop 141 to overcome the output from toroidal core C27 and set core C25 through minor aperture 143. This permits resumption of output from minor aperture 130 of core C25, permitting relay XRA to again energize. Front contact XRA5 therefore again closes, permitting relay XRA to remain energized during each interval when flasher relay FR is deenergized and no output is produced from minor aperture 130 of core C25. Moreover, back contacts XRA1, XRA2 and XRA3 open, and front contact XRA3 closes. Thus, short-circuits around the clear windings of cores C22 and C23 are removed, and capacitor 135 is again permitted to charge. Energization of relay XRA also turns off the warning means by opening back contact XRA4.

When the eastbound train leaves track section 2T, core C21 again becomes set. This causes resumption of output from minor apertures 121 and 122 of core C21. Output from minor apertures 121 of core C21 and 128 of core C24 produce sufficient energy on coupling loop 139 to overcome the output of toroidal core C26 and set core C25 through minor aperture 143. Relay XRA thus remains energized and the warning means remain deenergized. Core C23 also becomes cleared, causing cessation of output from its minor aperture 126. The system is now ready for the approach of a train once more, from either direction.

In the case of a westbound train, track section 2T is shunted prior to section 1T. This causes core C21 to clear, preventing output from minor apertures 120, 121 and 122 of the core. This prevents core C23 from becoming set through minor aperture 125, thereby halting output from minor aperture 126 of core C23. None of coupling loops 139, 140 and 141 now carry sufficient current to overcome the output from toroidal cores C26, C28 and C27 respectively. Therefore, core C25 is no longer set. This causes relay XRA to deenergize, turning on the warning means. Back contact XRA3 then closes, causing discharge of capacitor 135 through minor aperture 127 of core C24, thereby producing an output from minor aperture 127 which sets core C22 through minor aperture 123. Back contacts XRA1 and XRA2 also close, preventing cores C22 and C23 from clearing by short-circuiting their clear windings. Thus, core C22 remains set until current from track section 1T again flows through its major aperture.

When track sections 2T and 1T are both shunted, core C24 becomes cleared due to removal of set current from track section 1T, halting output from its minor apertures 128 and 129. Relay XRA remains deenergized.

After the train passes the crossing, only track section 1T is shunted. Current from track section 2T resumes flowing through the major aperture of core C21, setting the core, and thereby causing resumption of outputs from its minor apertures 121 and 122. Core C22 remains in the set conditions due to absence of clear current from track section 1T, and therefore continues to produce output pulses from its minor aperture 124. Hence, sufficient energy is produced from minor apertures 122 of core C21 and 124 of core C22 on coupling loop 140 to overcome the opposing output from toroidal core C28 and set core C25 through its minor aperture 144. As previously explained, this causes relay XRA to again energize, turning off the warning means.

When the train leaves track section 2T, core C24 receives set current from track section 1T, causing resumption of output from its minor apertures 128 and 129. Output from minor apertures 121 of core C21 and 128 of core C24 produces sufficient energy on coupling loop 139 to overcome the opposing output from toroidal core C26 and retain core C25 in the set condition through its minor aperture 143. The warning means thus remains in the off condition. Resumption of current from track section 1T also serves to halt output from minor aperture 124 of core C22 by reapplication of clear current through the major aperture. Thus, the initial conditions are again restored to the highway crossing system.

It will be obvious to those skilled in the art that the circuit of FIG. 4 can be adapted to use with the circuit of FIG. 6, where an island-type highway crossing protection system is required. Merely minor circuit changes are necessary in order to accommodate the three additional cores which are required, as previously explained.

Fail-safety is achieved in the circuit of FIG. 6 by utilization of clear current for cores C21, C24 and C25 to provide energization for flasher relay FR. Thus, if the flasher relay should become deenergized due to opening or short-circuiting of the conductor supplying energy to the relay, core C25 can never be cleared; instead, deenergization of flasher relay FR opens its front contact FR5. Capacitor 134 discharges through the upper half winding of relay XRA, and then relay XRA deenergizes, turning on the warning means. Thus, when contact FR5 is steadily open, core C25 can never produce output from minor aperture 130. Therefore, in the event of failure of energy supplied to flasher relay FR, relay XRA deenergizes as soon as capacitor 134 discharges through the upper half winding of relay XRA. Moreover, cores C26, C27 and C28 function as safety cores in that each one requires output from more than one minor aperture in order to set core C25 by exceeding the opposing current generated from the single aperture core.

FIGS. 7A and 7B shows circuit conditions for each core in the embodiment of FIG. 6. FIG. 7A illustrates conditions for eastbound trains while FIG. 7 illustrates conditions for westbound trains.

Thus there has been shown highway crossing protection systems utilizing apertured ferrite cores, for use with direct current track circuits. It will be obvious to those skilled in the art that alternating current track circuits may be used in lieu of direct current track circuits, providing signal rectification is performed prior to application of the signal to the core network. Moreover, the system can be adapted to use with an island-type D.C. track circuit highway crossing protection system. The system is fail-safe in regard to trains approaching the highway crossing on a single track from either direction, so that the warning means are actuated upon any type of circuit failure. The system is rugged, compact, insensitive to adverse atmospheric conditions, and has minimal power requirements.

Although but several embodiments of the present invention have been described, it is to be specifically understood that these forms are selected to facilitate in disclosure of the invention rather than to limit the number of forms which it may assume; various modifications and adaptations may be applied to the specific forms shown to meet requirements of practice, without in any manner departing from the spirit or scope of the invention.

What I claim is:

1. A highway crossing protection system comprising means for generating a pair of signals responsive to presence of a train on either side of a highway crossing, a network of apertured magnetic cores, means utilizing the signals for altering remanent magnetic states of the cores, pulse producing means providing signals for reading out pulses from the network, relay means for actuating warning means at the highway crossing upon deenergization, and safety core means coupling output of the network to the relay means and requiring output from more than one core of the network in order to energize the relay means.

2. The highway crossing protection system of claim 1 wherein the safety core means comprises a multiple aperture ferrite core producing pulses opposite in polarity to those produced by the network.

3. The highway crossing protection system of claim 1 wherein the safety core means comprises a plurality of single aperture ferrite cores, each of said single aperture cores producing pulses opposite in polarity to those produced by the network.

4. A highway crossing protection system comprising means for generating a pair of signals responsive to presence of a train on either side of a highway crossing, a network comprising a plurality of multi-aperture ferrite cores and a plurality of single aperture ferrite cores, means setting one multi-aperture core with one of said signals, means setting a second of said multi-aperture cores with the other of said signals, means coupling output from the first multi-aperture core to set a third multi-aperture core, means coupling output from the second multi-aperture core to set a fourth multi-aperture core, means coupling output from the first and second multi-aperture cores through a first single aperture core to set a fifth multi-aperture core, means coupling output from the first and fourth multi-aperture cores through a second single aperture core to set the fifth multi-aperture core, and means coupling output from the second and third multi-aperture cores through a third single aperture core to set the fifth multi-aperture core whereby the fifth multi-aperture core upon becoming set produces an output signal for deenergizing the warning means.

5. A highway crossing protection system comprising means for generating a pair of direct current signals responsive to presence of a train on either side of a highway crossing, a network of apertured ferrite cores, means coupling the first of said signals to first and second cores for priming thereof, means coupling the second of said signals to third and fourth cores for priming thereof, a safety core, and means coupling outputs on the first, second, third and fourth cores through the safety core whereby output from at least two of said four cores is required to overcome an opposing output of the safety core and thereby deenergize the warning means.

6. A highway crossing protection system comprising means for generating a plurality of signals indicative of location of a train on any of three track circuits at a highway crossing, a plurality of apertured magnetic cores, means coupling the signal from the track circuit at one end of the highway crossing to a first pair of cores, means coupling the signal from the track circuit at the other end of the highway crossing to a second pair of cores, means coupling the signal from the center track circuit of the highway crossing to one core of the first pair and one core of the second pair, and safety core means coupled to outputs of the cores of both pairs and requiring output from at least two cores of said pairs in order to provide a signal of sufficient amplitude to deenergize the warning means.

7. A highway crossing protection system comprising means for generating a plurality of signals indicative of location of a train on any of three track circuits at a highway crossing, a plurality of apertured magnetic cores, means coupling the signal from the track circuit at one end of the highway crossing to a first and second core, means coupling the signal from the track circuit at the other end of the highway crossing to a third and fourth core, means coupling the signal from the center track circuit of the highway crossing to the second and third cores, and safety core means coupled to outputs of the first four cores and requiring output from at least any two of said four cores in order to provide a signal of sufficient amplitude to deenergize the warning means.

8. A highway crossing protection system comprising a network of four apertured magnetic cores, means for generating a pair of signals indicative of presence of a train on either side of a highway crossing, means altering the remanent magnetic states of first and second cores of the network with one of the signals, means for altering the remanent magnetic states of third and fourth cores of the network with the other of the signals, warning means, and means coupling outputs from each of the four apertured cores to the warning means and requiring output from at least any two of the cores in order to deenergize the warning means.

9. The highway crossing protection system of claim 8 wherein the means coupling outputs from each of the four apertured cores to the warning means and requiring output from at least any two of the cores in order to deenergize the warning means comprises a safety core providing an output opposite in polarity and equivalent in amplitude to output from a single one of the four apertured cores.

10. The highway crossing protection system of claim 8 wherein the means coupling outputs from each of the four apertured cores to the warning means and requiring output from at least any two of the cores in order to deenergize the warning means comprises a plurality of toroidal cores, each of said toroidal cores providing an output opposite in polarity and equivalent in amplitude to output from a single one of the four apertured cores.

11. A highway crossing protection system comprising means for generating a pair of signals indicative of presence of a train on either side of a highway crossing, a network comprising a plurality of apertured magnetic cores, means coupling the signals to the core network whereby each signal serves to prime a pair of cores in the network, warning means, and means coupling output from the network to the warning means for deenergizing the warning means when outputs are produced from at least two cores in the network, said network providing outputs from at least two cores when both signals are applied to the network and when one signal is reapplied to the network after both signals have been removed from the network provided said one signal is the first signal to have been removed from the network.

12. The highway crossing protection system of claim 11 wherein said means coupling output from the network to the warning means includes safety core means providing an output opposite in polarity and equivalent in amplitude to output from a single core in said network.

13. A highway crossing protection system comprising means for generating a pair of signals responsive to presence of a train on either side of a highway crossing, warning means, a network of apertured magnetic cores, means coupling the first of said signals to a first apertured core, means coupling the second of said signals to a second apertured core, means coupling output from the first core to set a third apertured core, means coupling output from the second core to set a fourth apertured core, and safety means coupling the combined output of one pair of cores in a group of pairs of cores consisting of the first and second core, the first and fourth cores, and the second and third cores, to the warning means, said safety means comprising a plurality of apertured magnetic cores.

14. A highway crossing protection system comprising means for generating a pair of signals responsive to the presence of a train on either side of a highway crossing, warning means, a network of multi-aperture magnetic cores, means coupling the first of said signals to a first multi-aperture core, means coupling the second of said signals to a second multi-aperture core, means coupling output from the first multi-aperture core to set a third multi-aperture core, means coupling output from the second multi-aperture core to set a fourth multi-aperture core, and means responsive to the combined output of one pair of cores in a group of pairs of cores consisting of the first and second multi-aperture cores, the first and fourth multi-aperture cores, and the second and third multi-aperture cores for controlling the warning means, said responsive means comprising a fifth multi-aperture magnetic core.

15. A highway crossing protection system comprising means for generating a pair of signals responsive to the presence of a train on either side of a highway crossing; warning means; a network of multi-aperture cores; means coupling the first of said signals to a first multi-aperture core; means coupling the second of said signals to a second multi-aperture core; means coupling output from the first multi-aperture core to set a third multi-aperture core; means coupling output from the second multi-aperture core to set a fourth multi-aperture core; first, second and third toroidal cores, each of said toroidal cores continuously producing outputs; and means responsive to the combined output of a trio of cores in a group of core trios consisting of the first toroidal core and the first and second multi-aperture cores, the second toroidal core and the first and fourth multi-aperture cores, and the third toroidal core and the second and third multi-aperture cores for controlling the warning means, said responsive means comprising a fifth multi-aperture magnetic core.

16. A highway crossing protection system comprising means for generating a pair of signals indicative of presence of a train on either side of a highway crossing, a network comprising a plurality of apertured magnetic cores, warning means, flasher relay means comprising an alternately energized and deenergized relay, said flasher relay means being coupled to the warning means for operating said warning means, means coupling a first of the signals to a first apertured core for altering the remanent magnetic state of the core, means coupling the second of the signals to a second apertured core for altering the remanent magnetic state of said second core, means coupling energizing current for the flasher relay means through the first and second cores for clearing which ever of said first and second cores loses its signal indicative of the presence of a train, means coupling an output from the first core to a third core for altering the remanent magnetic state of the third core, means coupling an output from the second core to a fourth core for altering the remanent magnetic state of the fourth core, safety core means, first circuit means coupling an output from the first and second cores to the safety core means, second circuit means coupling output from the first and fourth cores to the safety core means, and third circuit means coupling output from the second and third cores to the safety core means, whereby output produced only from both cores coupled to either the first, second or third circuit means is coupled through the safety core means and deenergizes the warning means.

17. The highway crossing protection system of claim 16 wherein the safety core means comprises a multi-aperture core having a major aperture therein and said first, second and third circuit means being coupled through the major aperture.

References Cited by the Examiner

UNITED STATES PATENTS

| | | | |
|---|---|---|---|
| 2,927,220 | 3/1960 | Crane | 340—174 |
| 2,968,795 | 1/1961 | Briggs et al. | 340—174 |
| 2,994,067 | 7/1961 | Rajchman | 340—174 |
| 2,994,069 | 7/1961 | Rajchman et al. | 340—174 |
| 3,093,817 | 6/1963 | Rajchman et al. | 340—174 |

ARTHUR L. LA POINT, *Primary Examiner.*

S. B. GREEN, *Assistant Examiner.*